United States Patent
Shirase et al.

(10) Patent No.: US 12,470,261 B2
(45) Date of Patent: Nov. 11, 2025

(54) CONTROL APPARATUS, METHOD PERFORMED BY CONTROL APPARATUS, AND NON-TRANSITORY COMPUTER READABLE MEDIUM

(71) Applicant: NEC Corporation, Tokyo (JP)

(72) Inventors: Daichi Shirase, Tokyo (JP); Kazushi Muraoka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 18/744,838

(22) Filed: Jun. 17, 2024

(65) Prior Publication Data

US 2025/0088221 A1     Mar. 13, 2025

(30) Foreign Application Priority Data

Sep. 13, 2023 (JP) .................. 2023-148185

(51) Int. Cl.
*H04B 7/0413*        (2017.01)
*H04W 72/541*     (2023.01)

(52) U.S. Cl.
CPC ........ *H04B 7/0413* (2013.01); *H04W 72/541* (2023.01)

(58) Field of Classification Search
CPC .................... H04B 7/0413; H04W 72/541
See application file for complete search history.

(56) References Cited

U.S. PATENT DOCUMENTS

2018/0124765 A1\* 5/2018 Luo ............... H04B 7/0695

FOREIGN PATENT DOCUMENTS

JP        2018-061152 A        4/2018

OTHER PUBLICATIONS

E. Bjornson and L. Sanguinetti, "Scalable Cell-Free Massive MIMO Systems," IEEE Transactions on Communications, vol. 68, No. 7, Jul. 2020, pp. 4247-4261.

R. Takahashi, H. Matsuo and F. Adachi, "Scalable and Reconfigurable Distributed MU-MIMO System," 2022 IEEE 95th Vehicular Technology Conference: (VTC2022-Spring), Helsinki, Finland, 2022, pp. 1-5.

\* cited by examiner

*Primary Examiner* — Rahel Guarino

(74) *Attorney, Agent, or Firm* — Sughrue Mion, PLLC

(57) ABSTRACT

If interference between a second radio terminal and at least one of one or more first radio terminals is estimated to be a second degree greater than a first degree and less than a third degree, a control apparatus determines that the second radio terminal is required to belong to the same radio terminal subset as the at least one first radio terminal in order to allocate time and frequency resources to the second radio terminal for spatial multiplexing transmission. On the other hand, if interference between the second radio terminal and at least one of the one or more first radio terminals is estimated to be the third degree, the control apparatus determines that the second radio terminal is not allowed to belong to any radio terminal subset and that the second radio terminal is excluded from the spatial multiplexing transmission on the time and frequency resources.

17 Claims, 18 Drawing Sheets

| | RADIO TERMINAL INDEX | | | |
|---|---|---|---|---|
| | #1 | #2 | #3 | #4 |
| #1 | | $r_{1,2}$ | $r_{1,3}$ | $r_{1,4}$ |
| #2 | $r_{2,1}$ | | $r_{2,3}$ | $r_{2,4}$ |
| #3 | $r_{3,1}$ | $r_{3,2}$ | | $r_{3,4}$ |
| #4 | $r_{4,1}$ | $r_{4,2}$ | $r_{4,3}$ | |

(RADIO TERMINAL INDEX — row axis)

Fig. 9A

CONTROL APPARATUS, METHOD PERFORMED BY CONTROL APPARATUS, AND NON-TRANSITORY COMPUTER READABLE MEDIUM

INCORPORATION BY REFERENCE

This application is based upon and claims the benefit of priority from Japanese patent application No. 2023-148185, filed on Sep. 13, 2023, the disclosure of which is incorporated herein in its entirety by reference.

TECHNICAL FIELD

The present disclosure relates to radio communication systems, and in particular to spatially multiplexed transmission between a base station and a plurality of radio terminals using the same time and frequency resources.

BACKGROUND ART

Massive multiple-input multiple-output (MIMO) is a physical layer technology used in Third Generation Partnership Project (3GPP (registered trademark)) Fifth Generation (5G) systems. An antenna array is used for digital beamforming and in particular for multi-user MIMO (MU-MIMO), which spatially multiplexes a large number of radio terminals (i.e., User Equipments (UEs)) on the same time and frequency resources. Spatially distributed antenna arrays can be located within a single cell served by a base station.

One of the key technologies for Beyond 5G or Sixth Generation (6G) is distributed MIMO. The basic idea of distributed MIMO is to deploy multiple radio apparatuses, each equipped with one or more antennas, in a widely distributed manner in order to serve multiple radio terminals distributed over a large area (see, for example, Non-Patent Literature 1 and 2). The distributed radio apparatuses are connected by transmission lines to a control apparatus which is responsible for the digital baseband signal processing. The control apparatus responsible for the digital baseband signal processing is referred to as, for example, a baseband unit, digital unit, distributed unit (DU), central processing unit (CPU), or edge cloud processor. Distributed MIMO is also referred to as cell-free Massive MIMO or Distributed Antenna System (DAS). Each distributed radio apparatus can be referred to as a transmission and reception point (TRP), radio unit (RU), remote radio head, or access point (AP).

Distributed MIMO, like existing centralized MIMO, supports MU-MIMO transmission. A MU-MIMO base station can eliminate interference between radio terminals by digitally combining signals with precoding weights and post-coding weights during downlink transmission and uplink reception, respectively. Post-coding weights are also referred to as combiner weights, receive combiner weights, receive weights, spatial filtering weights, and so on. In the following, precoding weights and post-coding weights are collectively referred to as weights.

Non-Patent Literature 2 proposes a method for reducing the computational complexity of weight calculation in distributed MU-MIMO systems. In the method proposed in Non-Patent Literature 2, the control apparatus forms a subset (or cluster) of radio terminals selected from a plurality of radio terminals in the service area provided by a plurality of radio apparatus of a base station. The control apparatus also selects a subset (or cluster) of antennas from the plurality of antennas of the plurality of radio apparatus to serve each of the formed subsets of radio terminals. The combination of a subset of selected radio terminals (hereinafter referred to as a communicating radio terminal subset) and a subset of antennas serving these selected radio terminals (hereinafter referred to as an antenna subset) is called a subsystem. A communicating radio terminal subset includes one or more radio terminals that perform subset-wise MIMO transmission to or from the corresponding antenna subset on the same time and frequency resources. The base station or its control apparatus generates zero forcing (ZF) or minimum mean squared error (MMSE) weights on a per-subsystem basis. This reduces the amount of inverse matrix computation required for weight generation. The base station or its control apparatus may further select radio terminals (hereafter referred to as interfering radio terminals) to be considered as sources of interference when calculating weights on a per-subsystem basis. In this case, a subsystem is a combination of a communicating radio terminal subset, an antenna subset, and a subset of interfering radio terminals (hereinafter referred to as an interfering radio terminal subset). In the following, the method in which a base station calculates weights on a per-subsystem basis, as described in Non-Patent Literature 2, is referred to as the partial or local weight generation method. On the other hand, the method in which a base station or its control apparatus calculates weights by considering all of the multiple antennas connected to the control apparatus and all of the radio terminals served by these multiple antennas together is referred to as the global weight generation method.

Although the partial weight generation method reduces the amount of inverse matrix computation in weight generation, it results in degraded communication quality due to interference between radio terminals compared to the global weight generation method. This interference between radio terminals can be divided into intra-subset interference and inter-subset interference. Intra-subset interference is interference between radio terminals belonging to the same communicating radio terminal subset that remains after interference cancellation by the partial weight generation method. Inter-subset interference is interference from other radio terminal subsets not considered by the partial weight generation method to radio terminals belonging to the communicating radio terminal subset. When the partial weight generation method is used, there is significant performance degradation due to inter-subset interference.

Non-Patent Literature 2 proposes a radio resource allocation method for reducing inter-subset interference. The method proposed in Non-Patent Literature 2 defines an interference offset distance and classifies or divides multiple radio terminal subsets (or clusters) based on the interference offset distance. In the terminology of Non-Patent Literature 2, multiple radio terminal subsets are divided into multiple "layers". The method proposed in Non-Patent Literature 2 allocates a transmission opportunity (or time resources) to each layer in a predetermined order to mitigate the inter-subset interference at the cost of time scheduling loss.

Specifically, the method proposed in Non-Patent Literature 2 places multiple radio terminal subsets on the first layer whose distances between their cluster centers are greater than or equal to a predefined interference offset distance. In addition, the method may place a plurality of other radio terminal subsets on the second layer whose distance from any of the radio terminal subsets on the first layer is less than the interference offset distance and whose distance from each other is greater than or equal to the interference offset distance. The interference offset distance is defined, for example, as a multiple of the average distance between two neighboring radio terminal subsets. The method then allocates the frequency resources for spatial multiplexing transmission to the first and second layers in turn in a time-division manner. In other words, spatial multiplexing transmission using the same time and frequency resources is performed on a per-layer basis, and different layers do not share the same frequency and time resources for spatial multiplexing transmission.

Meanwhile, Patent Literature 1 points out that depending on a combination of radio terminals (UEs) to be spatially multiplexed for MU-MIMO transmission, even if the precoding weight is multiplied to the signals to be transmitted, the nulls may not be sufficiently directed to the radio terminals mutually, resulting in significant performance degradation, and therefore it is desirable to appropriately determine the combination of radio terminals to be multiplexed. Patent Literature 1 discloses a method for determining a group of radio terminals to receive MU-MIMO transmissions on the same time and frequency resources among multiple radio terminals. Specifically, the method calculates a Signal to Interference and Noise Ratio (SINR) per radio terminal based on the inner product of the received power vector of a first radio terminal already determined as belonging to the group of radio terminals and the received power vector of a candidate second radio terminal to be newly added to the group of radio terminals, and further calculates, using the calculated SINR, a metric indicating the throughput when the second radio terminal is newly added to the group of radio terminals. The method then determines whether the metric increases from before the second radio terminal is added, and if the metric increases, the method determines that the second radio terminal is added to the group of radio terminals.

In the following, unless otherwise noted, the term "subset of radio terminals" or "radio terminal subset" as used herein means a communicating radio terminal subset, or a subset defined as the union set of a communicating radio terminal subset and an interfering radio terminal subset.

PATENT LITERATURE

Patent Literature 1: JP 2018-061152 A

Non-Patent Literature

Non-Patent Literature 1: E. Bjornson and L. Sanguinetti, "Scalable Cell-Free Massive MIMO Systems," IEEE Transactions on Communications, vol. 68, no. 7, pp. 4247-4261, July 2020

Non-Patent Literature 2: R. Takahashi, H. Matsuo and F. Adachi, "Scalable and Reconfigurable Distributed MU-MIMO System," 2022 IEEE 95th Vehicular Technology Conference: (VTC2022-Spring), Helsinki, Finland, 2022, pp. 1-5

SUMMARY

The method described in Non-Patent Literature 2, i.e., dividing multiple radio terminal subsets into multiple layers based on the interference offset distance and allocating frequency resources for spatial multiplexing transmission to each layer in turn by time division, can reduce inter-subset interference by placing radio terminal subsets whose distance from each other is closer than the interference offset distance in separate layers. However, the method described in Non-Patent Literature 2 may not sufficiently reduce intra-subset interference. Since intra-subset interference is the residual interference after the main interference is removed by the partial weight generation method, it tends to have relatively less negative effect compared to inter-subset interference. However, because the partial weight generation method uses fewer antennas per subset for interference cancellation than the global weight generation method, intra-subset interference may not be adequately removed. Similar to inter-subset interference, residual intra-subset interference would also degrade communication quality.

The method described in Patent Literature 1 could possibly be used to reduce intra-subset interference in the method described in Non-Patent Literature 2. However, Patent Literature 1 does not assume a partial weight generation method as described in Non-Patent Literature 2. Accordingly, it is not sufficiently clear how to combine the method of Patent Literature 1 with the method of Non-Patent Literature 2 that uses the partial weight generation method.

One of the objects to be achieved by the example embodiments disclosed herein is to provide apparatuses, methods, and programs that help reduce both inter-subset interference and intra-subset interference when using a partial weighting method. It should be noted that this object is merely one of the objects to be achieved by the example embodiments disclosed herein. Other objects or problems and novel features will become apparent from the following description and the accompanying drawings.

In a first aspect, a control apparatus is configured to determine a plurality of radio terminal subsets to perform spatial multiplexing transmission on the same time and frequency resources to or from a base station apparatus equipped with a plurality of antennas. Each radio terminal subset includes one or more radio terminals performing subset-wise MIMO transmission on the time and frequency resources to or from a corresponding base station antenna subset selected from the plurality of antennas. Specifically, if an interference level between a second radio terminal and each of one or more first radio terminals that have already been determined to share the time and frequency resources for the spatial multiplexing transmission is estimated to be a first degree, the control apparatus determines that the time and frequency resources can be allocated to the second radio terminal and that the second radio terminal is allowed to any radio terminal subset. On the other hand, if an interference level between the second radio terminal and at least one of the one or more first radio terminals is estimated to be a second degree greater than the first degree and less than a third degree, the control apparatus determines that the second radio terminal is required to belong to the same radio terminal subset as the at least one first radio terminal in order to allocate the time and frequency resources to the second radio terminal for the spatial multiplexing transmission. Further, if an interference level between the second radio terminal and at least one of the one or more first radio terminals is estimated to be the third degree greater than the first degree and the second degree, the control apparatus determines that the second radio terminal is not allowed to belong to any radio terminal subset and that the second radio terminal is excluded from the spatial multiplexing transmission on the time and frequency resources.

In a second aspect a method performed by a control apparatus, the method comprising determining a plurality of radio terminal subsets to perform spatial multiplexing transmission on the same time and frequency resources to or from a base station apparatus equipped with a plurality of antennas. Each radio terminal subset includes one or more radio terminals performing subset-wise MIMO transmission on the time and frequency resources to or from a corresponding base station antenna subset selected from the plurality of antennas. Specifically, the determining includes the steps of:

(a) if an interference level between a second radio terminal and each of one or more first radio terminals that have already been determined to share the time and frequency resources for the spatial multiplexing transmission is estimated to be a first degree, determining that the time and frequency resources can be allocated to the second radio terminal and that the second radio terminal is allowed to any radio terminal subset;

(b) if an interference level between the second radio terminal and at least one of the one or more first radio terminals is estimated to be a second degree greater than the first degree and less than a third degree, determining that the second radio terminal is required to belong to the same radio terminal subset as the at least one first radio terminal in order to allocate the time and frequency resources to the second radio terminal for the spatial multiplexing transmission; and (c) if an interference level between the second radio terminal and at least one of the one or more first radio terminals is estimated to be the third degree greater than the first degree and the second degree, determining that the second radio terminal is not allowed to belong to any radio terminal subset and that the second radio terminal is excluded from the spatial multiplexing transmission on the time and frequency resources.

In a third aspect, a program includes a set of instructions (software codes) that, when loaded into a computer, cause the computer to perform the method according to the second aspect described above.

BRIEF DESCRIPTION OF DRAWINGS

The above and other aspects, features, and advantages of the present invention will become more apparent from the following description of certain example embodiments when taken in conjunction with the accompanying drawings, in which:

FIG. 9A schematically illustrates an example of the operation of an index calculation unit related to one or more example embodiments;

DETAILED DESCRIPTION

Specific example embodiments will be described hereinafter in detail with reference to the drawings. The same or corresponding elements are denoted by the same symbols throughout the drawings, and duplicated explanations are omitted as necessary for the sake of clarity.

The multiple example embodiments described below may be implemented independently or in combination, as appropriate. These example embodiments include novel features different from each other. Accordingly, these example embodiments contribute to attaining objects or solving problems different from one another and contribute to obtaining advantages different from one another.

Each of the drawings or figures is merely an example to illustrate one or more example embodiments. Each figure may not be associated with only one particular example embodiment but may be associated with one or more other example embodiments. As will be appreciated by those of ordinary skill in the art, various features or steps described with respect to any one of the figures may be combined with features or steps illustrated in one or more other figures to produce, for example, example embodiments that are not explicitly illustrated or described. Not all of the features or steps illustrated in any one of the figures to describe an example embodiment are necessarily essential, and some features or steps may be omitted. The order of the steps described in any of the figures may be changed as appropriate.

As used in this specification, "if" can be interpreted to mean "when", "at or around the time", "after", "upon", "in response to determining", "in accordance with a determination", or "in response to detecting", depending on the context. These expressions can be interpreted to mean the same thing, depending on the context.

Radio Communication System Configuration

Figure 1:
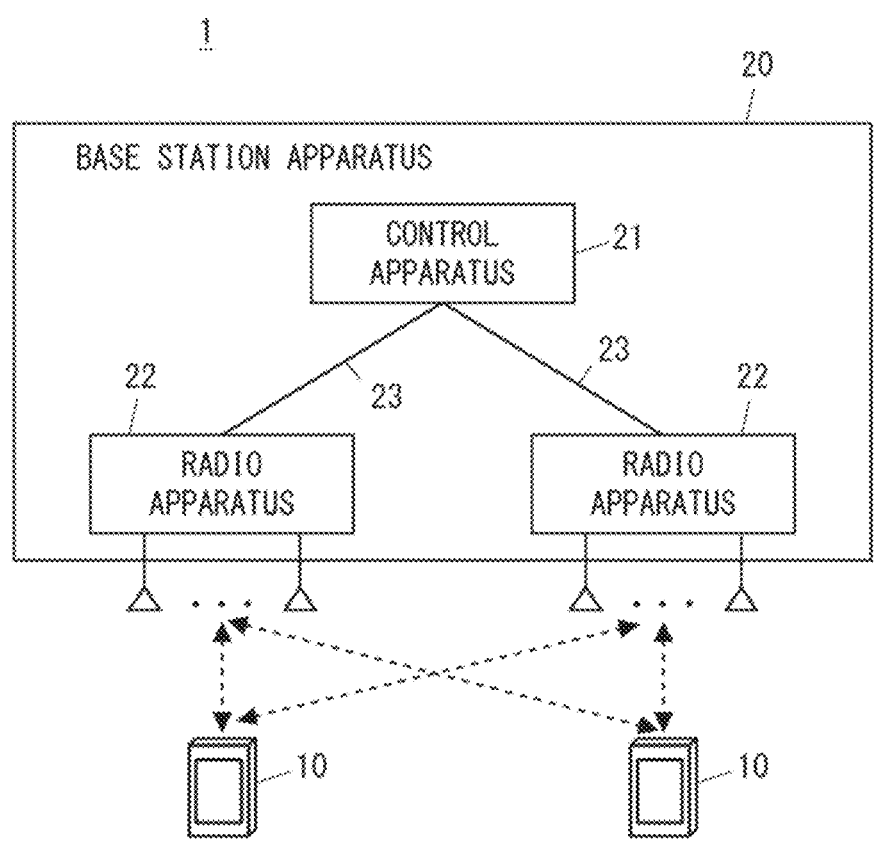
FIG. 1 shows an example configuration of a radio communication system related to one or more example embodiments.

First, the configuration and operation of a plurality of elements that are common to a plurality of example embodiments will be described. FIG. 1 shows an example configuration of a radio communication system 1 related to a plurality of example embodiments. The radio communication system 1 may be a system conforming to the 3GPP technical specifications or to the 5G technical specifications, as examples and not as limitations. Each element (network function) shown in FIG. 1 may be implemented, for example, as a network element on dedicated hardware, as a software instance running on dedicated hardware, or as a virtualized function instantiated on an application platform.

In the example shown in FIG. 1, the radio communication system 1 includes a plurality of radio terminals 10 and a base station apparatus 20. The radio communication system 1 may include three or more radio terminals 10. When describing matters common to a plurality of radio terminals 10, reference is made to one radio terminal 10 unless otherwise noted.

The base station apparatus 20 includes a control apparatus 21 and one or more radio apparatuses 22. The base station device 20 may be, for example, a base station or a base station element of a RAN. The base station apparatus 20 may be referred to by other terms, such as base station, radio station, RAN node, or access point. When a beyond 5G or 6G system is assumed, the base station apparatus 20 may be an enhanced gNB, or a DU and one or more radio units (RUs) in an enhanced gNB.

The radio terminal 10 may be, for example, a handheld device such as a smartphone, cellular phone, or tablet, or a sensing device. The radio terminal 10 may be a relay device with the ability to relay signals to and/or from other radio terminals. The radio terminal 10 may be referred to by other terms, such as mobile terminal, mobile station, UE, or wireless transmit receive unit (WTRU). Some or all of the plurality of radio terminals 10 are spatially multiplexed on the same time and frequency resources to transmit to or receive from the base station apparatus 20. The radio terminal 10 may have one or more transmission layers or more reception layers, or both.

Base Station Apparatus Configuration

As described above, the base station apparatus 20 includes a control apparatus 21 and one or more radio apparatuses 22. The base station apparatus 20 may include only one radio apparatus 22 or three or more radio apparatuses 22. When describing matters common to a plurality of radio apparatuses 22, reference is made to one radio apparatus 22, unless otherwise noted.

The control apparatus 21 may be responsible for digital baseband signal processing and scheduling processing. For example, the control apparatus 21 may be referred to as a baseband unit, a digital unit, a distributed unit (DU), a CPU, or an edge cloud processor. When assuming a beyond 5G or 6G system, the control apparatus 21 may host the Radio Link Control (RLC) and Medium Access Control (MAC) layers of an enhanced gNB, and may host part or all of the Physical (PHY) layer of an enhanced gNB. In the case where the control apparatus 21 hosts part of the PHY layer, i.e., a high PHY layer, the signal processing of the remaining PHY layer, i.e., a low PHY layer, is located in the radio apparatus 22. The control apparatus 21 may include functions of an enhanced gNB Central Unit (CU) or it may include functions of a RAN Intelligent Controller (RIC). The RIC may be a Near-Real-Time (Near-RT) RIC or a Non-RT RIC, or both, conforming to the relevant Open RAN (O-RAN) technical specifications. Some or all of the functions of the control apparatus 21 may be implemented in a virtualized or cloudified platform as virtualized, containerized, or cloudified network functions.

The radio apparatus 22 may be located at a distance from the control apparatus 21. The plurality of radio apparatus 22 may be geographically distributed. That is, the base station apparatus 20 may support distributed MIMO. Distributed MIMO, like existing centralized MIMO, supports MU-MIMO transmission communicating with a plurality of radio terminals 10 that are spatially multiplexed on the same time and frequency resources.

The control apparatus 21 is connected to the radio apparatus 22 via a transmission line 23 and communicates with one or more radio terminals 10 via the radio apparatus 22. The transmission line 23 may be an optical fiber, a metal cable, or a wireless transmission line. The transmission line 23 may use, for example, Radio over Fiber (RoF) technology, Common Public Radio Interface (CPRI) technology, or Enhanced CPRI (eCPRI) technology.

Radio Terminal Configuration

Figure 2:
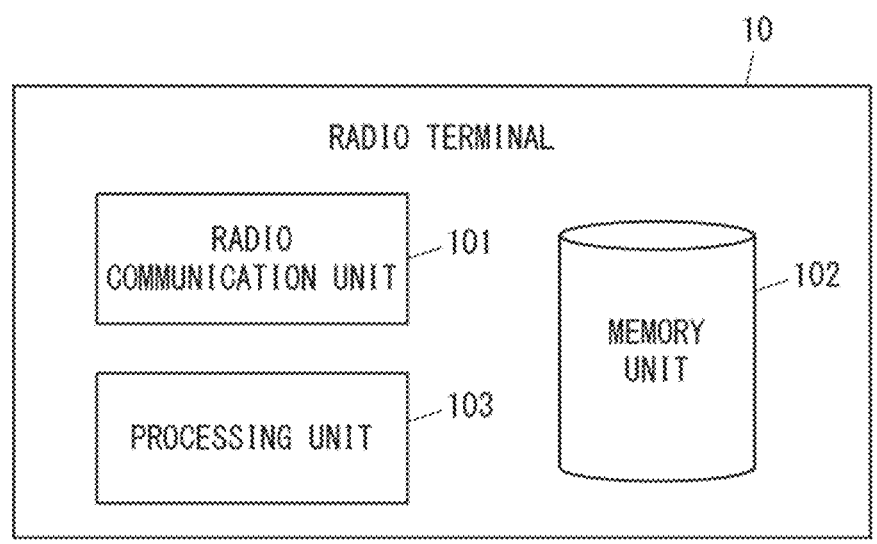
FIG. 2 shows an example configuration of a radio terminal related to one or more example embodiments.

FIG. 2 shows an example configuration of the radio terminal 10. The radio terminal 10 includes a radio communication unit 101, a memory unit 102, and a processing unit 103. The radio communication unit 101 is an element that performs radio communication with the radio apparatus 22. For example, the radio communication unit 101 includes an antenna and radio frequency (RF) circuitry. The memory unit 102 includes a volatile memory and a non-volatile memory. For example, the volatile memory may include a random access memory (RAM). The non-volatile memory may include, for example, one or more of a read only memory (ROM), a hard disk drive (HDD), and a solid state drive (SSD). The non-volatile memory stores program code (or instructions) for various functions of the radio terminal 10. The processing unit 103 includes one or more processors. For example, the one or more processors may include one or more of a central processing unit (CPU), a micro processing unit (MPU), a field programmable gate array (FPGA), and an application-specific Integrated Circuit (ASIC). The processing unit 103 executes program code stored in the memory unit 102, thereby implementing various functions of the radio terminal 10.

Control Apparatus Configuration

Figure 3:
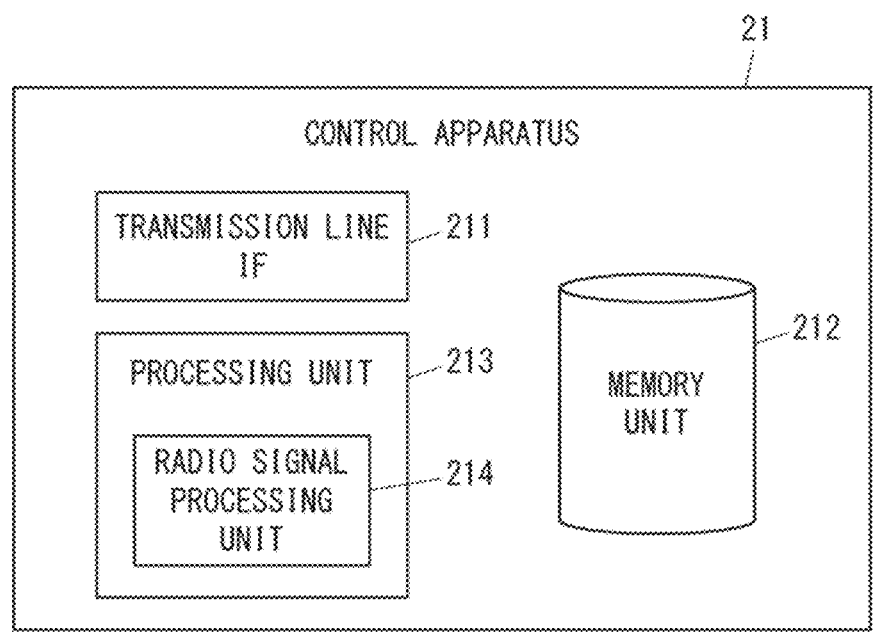
FIG. 3 shows an example configuration of a control apparatus related to one or more example embodiments.

FIG. 3 shows an example configuration of the control apparatus 21. The control apparatus 21 includes a transmission line interface (IF) 211, a memory unit 212, and a processing unit 213. The transmission line IF 211 includes an interface that communicates with the radio apparatus 22 via the transmission line 23. The memory unit 212 includes a volatile memory and a non-volatile memory. For example, the volatile memory may include a RAM. For example, the non-volatile memory may include one or more of a ROM, an HDD, and an SSD. The non-volatile memory stores program code (or instructions) for various functions of the control apparatus 21. The processing unit 213 includes one or more processors. The one or more processors may include, for example, one or more of a CPU, an MPU, an FPGA, and an ASIC. The processing unit 213 executes program code stored in the memory unit 212, thereby implementing various functions of the control apparatus 21.

The processing section 213 includes a radio signal processing unit 214 as a functional block. The radio signal processing unit 214 performs transmission and reception processing of radio signals. The processing unit 213 may further include components other than the above functional block. In other words, the processing unit 213 may perform operations other than those performed by the functional block described above. The radio apparatus 22 may provide some of the functions of the radio signal processing unit 214. In another implementation, any other apparatus physically remote from the control apparatus 21 may provide some of the functions of the radio signal processing unit 214. The detailed configuration of the radio signal processing unit 214 is described below.

Radio Apparatus Configuration

Figure 4:
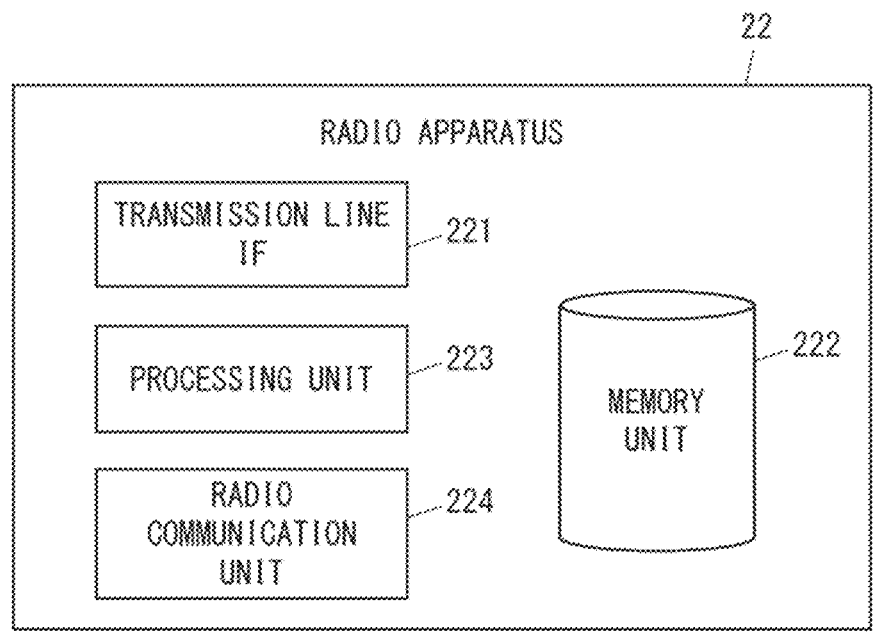
FIG. 4 shows an example configuration of a radio apparatus related to one or more example embodiments.

FIG. 4 shows an example configuration of the radio apparatus 22. The radio apparatus 22 includes a transmission line IF 221, a memory unit 222, a processing unit 223, and a radio communication unit 224. The transmission line IF 221 is an interface for communicating with the control apparatus 21 via the transmission line 23. The memory unit 222 includes a volatile memory and a non-volatile memory. For example, the volatile memory may include a RAM. For example, the non-volatile memory may include one or more of a ROM, an HDD, and an SSD. The non-volatile memory stores program code (or instructions) for various functions of the radio apparatus 22. The processing unit 223 includes one or more processors. For example, the one or more processors may include one or more of a CPU, an MPU, an FPGA, and an ASIC. The processing unit 223 executes program code stored in the memory unit 222, thereby implementing various functions of the radio apparatus 22.

The radio communication unit 224 is an element that performs radio communication with the radio terminal 10. For example, the radio communication unit 224 includes an antenna and RF circuitry. The radio communication unit 224 transmits radio frequency signals to the radio terminal 10 in downlink communication and receives radio frequency signals from the radio terminal 10 in uplink communication. The radio communication unit 224 is equipped with one or more antenna elements. In the case where the radio communication unit 224 is provided with a plurality of antenna elements, the radio communication unit 224 may have a fully digital configuration in which each antenna element is connected to its own RF circuit, or a sub-array configuration in which a sub-array consisting of multiple antenna elements shares a single RF circuit. When the radio communication unit 224 has a sub-array configuration, each sub-array may perform analog beamforming. The port on the baseband side of an RF circuit is considered to be an equivalent antenna in the baseband domain and is hereinafter referred to as an antenna.

Radio Signal Processing Unit Configuration

Figure 5:
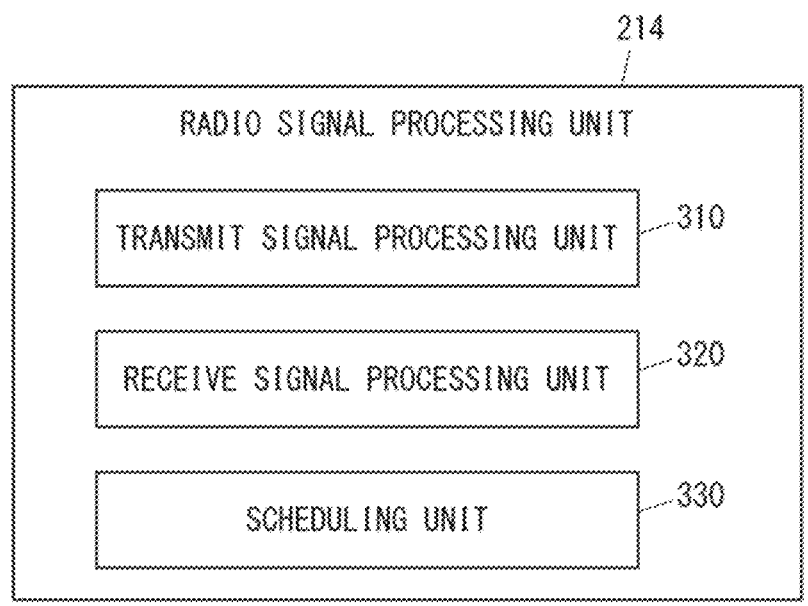
FIG. 5 shows an example configuration of a radio signal processing unit related to one or more example embodiments.

FIG. 5 shows an example configuration of the radio signal processing unit 214 in the control apparatus 21. The radio signal processing unit 214 includes a transmit signal processing unit 310, a receive signal processing unit 320, and a scheduling unit 330. The transmit signal processing unit 310 generates signals to be transmitted to the radio terminals 10. The transmit signal processing unit 310 transmits the generated signals to the radio apparatus 22 via the transmission channel IF 211. When generating the signals to be transmitted to the radio terminals 10, the transmit signal processing unit 310 may digitally combine the signals using precoding weights. The transmit signal processing unit 310 may also use a partial weight generation method for weight calculations.

The receive signal processing unit 320 receives signals received by the radio apparatus 22 via the transmission line IF 221. When processing the signals received by the radio apparatus 22, the receive signal processing unit 320 may digitally combine the signals using post-coding weights. The receive signal processing unit 320 may also use a partial weight generation method for weight calculations. The receive signal processing unit 320 measures channel information between the radio apparatus 22 and the radio terminal 10 using one or more reference signals received via the transmission channel IF 221, and sends it to the scheduling unit 330. The one or more reference signals may be, for example, one or both of a Sounding Reference Signal (SRS) and a Demodulation Reference Signal (DMRS).

The scheduling unit 330 allocates radio resources to be used for radio communication with the radio terminals 10. In other words, the scheduling unit 330 allocates radio resources to a plurality of radio terminals 10. For example, radio resources may include antennas, beams, frequencies and times, etc. When a partial weight generation method is used, the scheduling unit 330 may also perform subsystem determination.

Specifically, the scheduling unit 330 estimates interference levels or degrees between the plurality of radio terminals 10 based on the channel information received from the receiving signal processing unit 320. The scheduling unit 330 may calculate indices representing the interference level between two or more radio terminals 10 based on the channel information received from the receiving signal processing unit 320. These indices are hereinafter referred to as interference level indices. Each of the interference level indices may be an index representing the level or degree of interference between two radio terminals 10, i.e., a radio terminal pair. Alternatively, each of the interference level indices may be an index representing the level or degree of interference between a radio terminal 10 and a group of radio terminals. Next, using the estimated interference levels or using the calculated interference level indices, the scheduling unit 330 determines one or more radio terminal subsets to which each radio terminal 10 can belong, and determines whether or not radio resources can be allocated to each radio terminal 10. The scheduling unit 330 then sends the information on the radio terminal subsets to which the respective radio terminals 10 can belong and the results of the radio resource allocation to the transmit signal processing unit 310 and the receive signal processing unit 320.

First Example Embodiment

An example configuration of a radio communication system according to this example embodiment is the same as in the examples described with reference to FIGS. 1 to 5. This example embodiment provides details of the selection of radio terminals 10 to which the same time and frequency resources are allocated for spatial multiplexing transmission in the downlink or uplink. The spatial multiplexing transmission may be a downlink transmission or an uplink transmission or both. The spatial multiplexing transmission may also be referred to as spatial multiplexing communication. In this example embodiment, the scheduling unit 330 selects multiple radio terminal subsets that share or are allocated the same time and frequency resources for the spatial multiplexing communication, and determines one or more radio terminals 10 that are excluded from the spatial multiplexing communication in those time and frequency resources.

Figure 6:
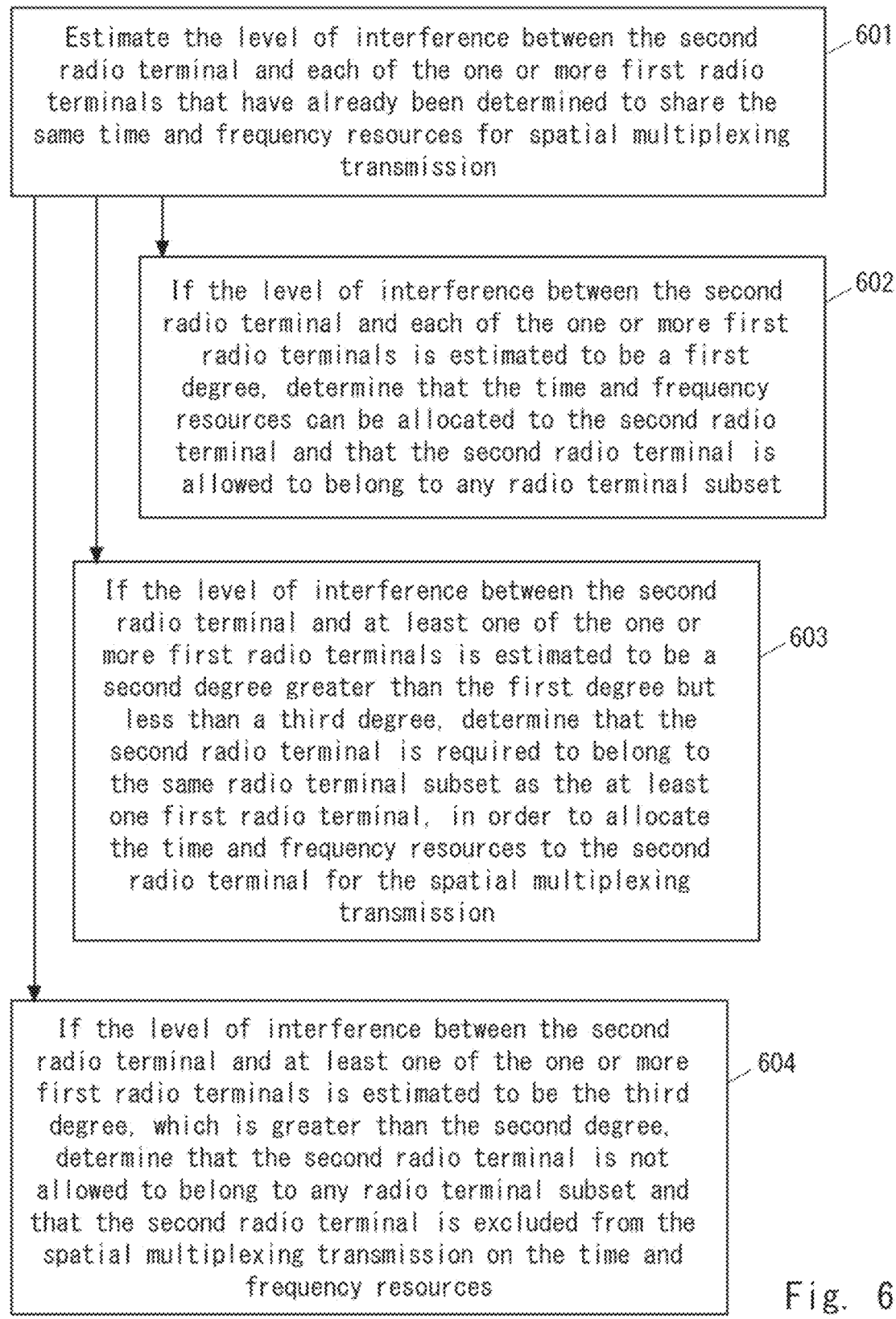
FIG. 6 is a flowchart showing an example of the operation of a control apparatus related to one or more example embodiments.

FIG. 6 shows an example of the processing performed by the scheduling unit 330. In the example in FIG. 6, "one or more first radio terminals" are the one or more radio terminals 10 that have already been determined by the scheduling unit 330 to share the same time and frequency resources for spatial multiplexing transmission. The one or more first radio terminals have been determined to be able to belong to a single radio terminal subset or to be able to be divided into two or more radio terminal subsets. Each radio terminal subset includes one or more radio terminals 10 performing a subset-wise spatial multiplexing transmission or MIMO transmission (or MIMO communication) on the same time and frequency resources to or from the corresponding antenna subset in the base station apparatus 20 in the uplink or downlink. A radio terminal subset is the unit for which the calculation of precoding or post-coding weights is performed on a per-subsystem basis using a partial weight generation method. The precoding or post-coding weights for each radio terminal subset can be calculated using a common interference cancellation matrix. In other words, a radio terminal subset within a subsystem is subject to a common interference cancellation matrix. The interference cancellation matrix refers to the inverse matrix part within a formula for calculating ZF weights or MMSE weights.

On the other hand, in the example in FIG. 6, a "second radio terminal" is a candidate radio terminal 10 that is newly determined whether or not to be added to "one or more first radio terminals". That is, the process in FIG. 6 determines for spatial multiplexing communication whether or not a new second radio terminal is allowed to share the same time and frequency resources with one or more first radio terminals that have already been determined. If it is determined that the second radio terminal is allowed to share the resources with the one or more first radio terminals, then the process in FIG. 6 further determines one or more radio terminal subsets to which the second radio terminal is allowed to belong.

In step 601, the scheduling unit 330 estimates the level or degree of interference between the second radio terminal and each of the one or more first radio terminals that have already been determined to share the same time and frequency resources for spatial multiplexing transmission. As already described, the scheduling unit 330 may obtain or calculate one or more interference level indices, each representing the degree of interference between the second radio terminal and a respective one of the one or more first radio terminals, based on the channel information received from the received signal processing unit 320. Each of these interference level indices may represent the degree of interference between the second radio terminal and each of the one or more first radio terminal, i.e., a radio terminal pair. Alternatively, each of these interference level indices may be an index representing the degree of interference between the second radio terminal and each of a plurality of radio terminal groups to which the one or more first radio terminals belong. More specifically, each of these interference level indices may represent the degree of interference between the second radio terminal and each of the one or more radio terminal subsets to which the one or more first radio terminals belong or are allowed to belong.

In step 602, the interference level between the second radio terminal and each of the one or more first radio terminals is estimated to be a first degree. In this case, the scheduling unit 330 determines that the time and frequency resources in question can be allocated to the second radio terminal and that the second radio terminal is allowed to belong to any radio terminal subset. The second radio terminal may be grouped into one of the one or more radio terminal subsets to which the one or more first radio terminals belong or are allowed to belong. Alternatively, the second radio terminal may be assigned to a new radio terminal subset that is different from the radio terminal subsets to which the one or more first radio terminals belong or are allowed to belong. This allows the second radio terminal to share the same time and frequency resources with one or more radio terminals that are estimated to have relatively low interference with the second radio terminal.

In step 603, the interference level between the second radio terminal and at least one of the one or more first radio terminals is estimated to be a second degree greater than the first degree and less than a third degree. In this case, the scheduling unit 330 determines that the second radio terminal is required to belong to the same radio terminal subset as the at least one first radio terminal that is estimated to have the second degree of interference with the second radio terminal, in order to allocate the time and frequency resources in question to the second radio terminal for the spatial multiplexing transmission. This allows the second radio terminal to be grouped in the same radio terminal subset as at least one first radio terminal that is estimated to have some degree of interference, and this intra-subset interference can be reduced using a partial weight generation method.

In step 604, the interference level between the second radio terminal and at least one of the one or more first radio terminals is estimated to be the third degree greater than the second degree. In this case, the scheduling unit 330 determines that the second radio terminal is not allowed to belong to any radio terminal subset and that the second radio terminal is excluded from the spatial multiplexing transmission on the time and frequency resources in question. This ensures that the second radio terminal does not share the same time and frequency resources with one or more radio terminals that are estimated to have relatively strong interference. Specifically, according to step 604, the second radio terminal, which is estimated to have significant interference with the one or more first radio terminals and for which the elimination of intra-subset interference by the partial weight generation method is not sufficient, can be excluded from the spatial multiplexing transmission using the same time and frequency resources as the one or more first radio terminals.

The scheduling unit 330 repeats the process of FIG. 6 for a plurality of second radio terminals, i.e., radio terminals for which it has not yet been determined whether the time and frequency resources in question can be shared with other radio terminals (i.e., one or more first radio terminals).

According to the operation or processing described with reference to FIG. 6, based on the determination results of steps 602 and 603, the base station apparatus 20, the control apparatus 21, or the scheduling unit 330 can form a plurality of radio terminal subsets for the partial weight generation method. Meanwhile, based on the result of the decision in step 604, the base station apparatus 20, the control apparatus 21, or the scheduling unit 330 can exclude radio terminals for which the elimination of intra-subset interference by the partial weight generation method is presumed to be insufficient from the spatial multiplexing transmission on the time and frequency resources in question. This helps to reduce both inter-subset interference and intra-subset interference when the partial weight generation method is used.

Second Example Embodiment

An example configuration of a radio communication system according to this example embodiment is the same as in the examples described with reference to FIGS. 1 to 5. This example embodiment provides details of the selection of radio terminals 10 that share the same time and frequency resources for spatial multiplexing transmission, as described in the first embodiment.

Scheduling Unit Configuration

Figure 7:
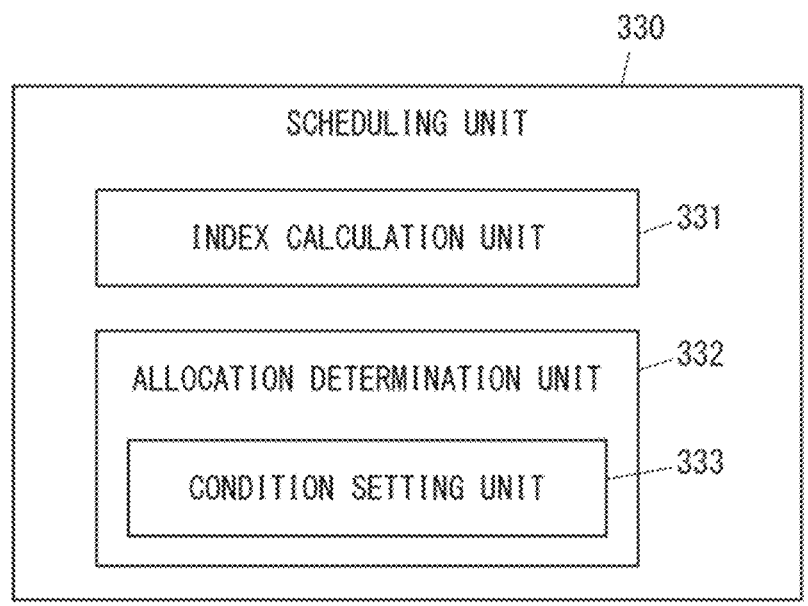
FIG. 7 shows an example configuration of a scheduling unit related to one or more example embodiments.

FIG. 7 shows an example configuration of the scheduling unit 330. The scheduling unit 330 includes an index calculation unit 331 and an allocation determination unit 332. The index calculation unit 331 receives channel information between the radio apparatus 22 and a plurality of radio terminals 10 from the receiving signal processing unit 320 and calculates interference level indices between the plurality of radio terminals 10 based on the received channel information. The index calculation unit 331 sends the calculated interference level indices to the allocation determination unit 332 or the memory unit 212.

The allocation determination unit 332 receives one or more interference level indices from the index calculation unit 331 or the memory unit 212. The allocation determination unit 332 includes a condition setting unit 333. The condition setting unit 333 configures a first condition, a second condition, and a third condition regarding the interference level indices. The first condition represents or corresponds to the case where the interference between two radio terminals, as estimated from an interference level index, is relatively small (e.g., the first degree). The second condition represents or corresponds to the case where the interference between two radio terminals, as estimated from an interference level index, is moderate (e.g., the second degree greater than the first degree). The third condition represents or corresponds to the case where the interference between two radio terminals, as estimated from an interference level index, is relatively high (e.g., the third degree greater than the second degree)

The allocation determination unit 332 determines whether each radio terminal 10 is allowed to share the same time and frequency resources with other radio terminals 10 for spatial multiplexing transmission based on the received one or more interference level indexes and the configured first, second, and third conditions. Further, the allocation determination unit 332 determines one or more radio terminal subsets to which each radio terminal 10 that is allowed to share the radio resources belongs or is allowed to belong.

Specifically, if the interference level index between two radio terminals satisfies the first condition, then the allocation decision unit 332 determines that the partial weight generation method is not required to eliminate interference between these two radio terminals. In other words, the allocation determination unit 332 allows these two radio terminals to belong to different radio terminal subsets from each other. This operation corresponds to step 602 in FIG. 6.

If the interference level index between two radio terminals satisfies the second condition, then the allocation determination unit 332 determines that the partial weight generation method is required to eliminate interference between these two radio terminals. In other words, the allocation determination unit 332 determines that these two radio terminals should belong to the same radio terminal subset. This operation corresponds to step 603 in FIG. 6.

If the interference level index between two radio terminals meets the third condition, then the allocation determination unit 332 determines that the interference between these two radio terminals cannot be sufficiently eliminated by the partial weight generation method. In other words, the allocation determination unit 332 determines that these two radio terminals are not allowed to share the same time and frequency resources. This action corresponds to step 604 in FIG. 6.

Examples of Interference Level Index

Figure 8:
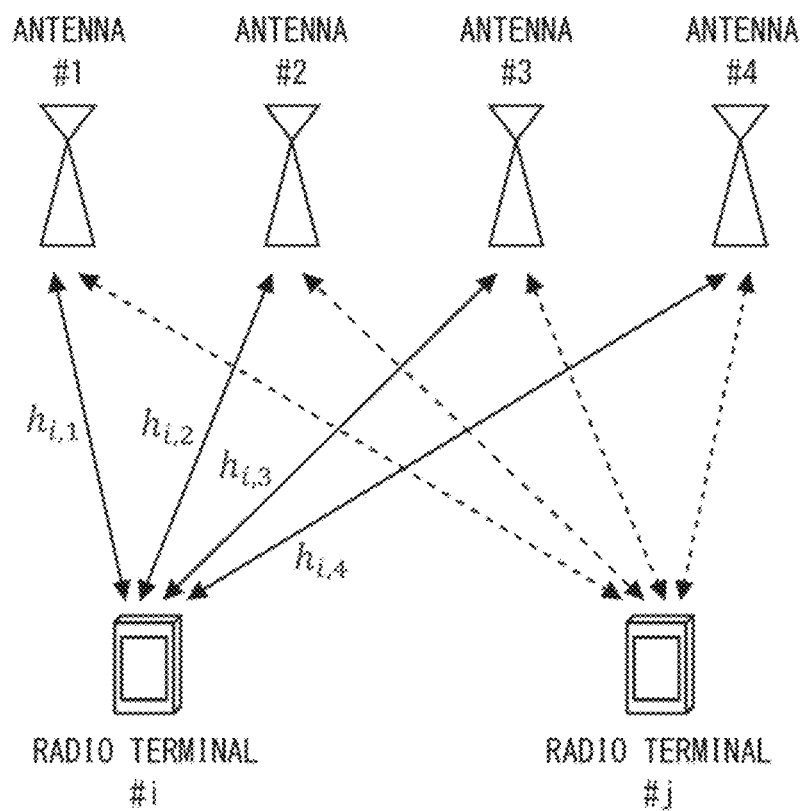
FIG. 8 conceptually illustrates an example of an index representing the level of interference related to one or more example embodiments.

FIG. 8 conceptually illustrates examples of interference level indices calculated in the index calculation unit 331. As a first example, the interference level index may be a channel spatial correlation of each radio terminal 10, which can be calculated from a channel coefficient or channel power between each radio terminal 10 and a plurality of antennas of the one or more radio apparatuses 22. The index calculation unit 331 may calculate the interference level index $r_{i,j}$ based on the spatial correlation between the two radio terminals #i and #j by the following formula, which corresponds to using the channel coefficient between each radio terminal 10 and a plurality of antennas of the one or more radio apparatuses 22:

$$r_{i,j} = \frac{h_i^H h_j}{\|h_i\|\|h_j\|}$$

where $h_i$ is the channel vector of the radio terminal #i and $h_j$ is the channel vector of the radio terminal #j. The numerator is the inner product of the channel vector $h_i$ and the channel vector $h_j$. Each element of the channel vector $h_i$ is a channel coefficient between the radio terminal #i and a respective one of a plurality of antennas of a part or all of the one or more radio apparatuses 22 connected to the control apparatus 21. Similarly, each element of the channel vector $h_j$ is a channel coefficient between the radio terminal #j and a respective one of a plurality of antennas of a part or all of the one or more radio apparatuses 22 connected to the control apparatus 21.

In the case where the channel powers are used instead of the channel coefficients to obtain the interference level index, each element of the channel vectors $h_i$ and $h_j$ in the above formula is replaced by a channel power. The channel power can be the square value of the channel coefficient estimated from, for example, SRS or DMRS. Alternatively, the channel power may be calculated using the received power (e.g., Reference Signal Received Power (RSRP)) of a downlink reference signal as reported by a radio terminal.

If the radio terminal 10 is equipped with a plurality of antennas, the index calculation unit 331 may calculate the interference level index in the following manner. In a first example, the index calculation unit 331 may calculate the interference level index using the channel vector or the channel power vector between an antenna arbitrarily selected from the plurality of antennas of the radio terminal 10 and each of the plurality of antennas of a part or all of the one or more radio apparatuses 22 connected to the control apparatus 21.

In a second example, the index calculation unit 331 may use a channel vector or channel power vector that is a concatenation of channel vectors or channel power vectors between each of the plurality of antennas of a part or all of the one or more radio apparatuses 22 and a respective one of a part or all of the plurality of antennas of the radio terminal 10.

In a third example, the index calculation unit 331 may calculate channel power vectors between each of the plurality of antennas of a part or all of the one or more radio apparatuses 22 and a respective one of a part or all of the plurality of antennas of the radio terminal 10, and then calculate the interference level index using the sum or average of these channel power vectors.

In a fourth example, the index calculation unit 331 may use an equivalent channel vector or equivalent channel power vector between the radio terminal 10 and the plurality of antennas of a part or all of the one or more radio apparatuses 22 when the signals transmitted or received by part or all of the plurality of antennas of the radio terminal 10 are combined with certain weights.

Example Operation of Index Calculation Unit

Figure 9B:
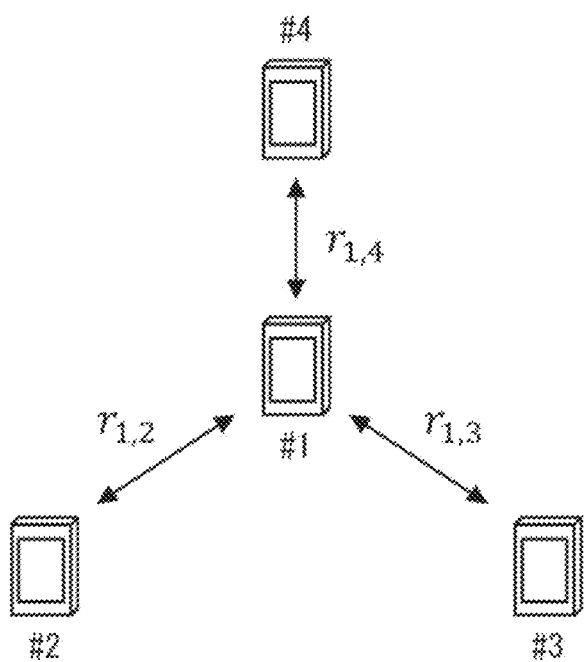
FIG. 9B schematically illustrates an example of the operation of an index calculation unit related to one or more example embodiments.

An example of the operation of the index calculation unit 331 is described with respect to the case where the interference level index is the first example described above. The index calculation unit 331 calculates the interference level indices for all possible pairs of a part or all of the plurality of radio terminals 10. All of the plurality of radio terminals 10 may be all of the radio terminals 10 located within the service area of the base station apparatus 20. A part of the plurality of radio terminals 10 may be one or more radio terminals 10 that are located within the service area of the base station apparatus 20 and are awaiting allocation of radio resources. FIGS. 9A and 9B are conceptual diagrams representing examples of the operation of the index calculation section 331. FIG. 9A shows an example of calculating 12 interference level indices for four radio terminals #1 to #4. In an example in FIG. 9B, the index calculation unit 331 calculates interference level indices $r_{1,2}$, $r_{1,3}$, and $r_{1,4}$ between radio terminal #1 and radio terminals #2 to #4, respectively.

Each time the allocation determination unit 332 determines whether or not to allocate radio resources to each radio terminal 10 and the subset of radio terminals to which each radio terminal 10 can belong, the index calculation unit 331 may calculate the interference level indices. Alternatively, the interference level indices calculated by the index calculation unit 331 may be reused in multiple times of decisions in the allocation determination unit 332.

Example Operation of Condition Setting Unit

Figure 10:
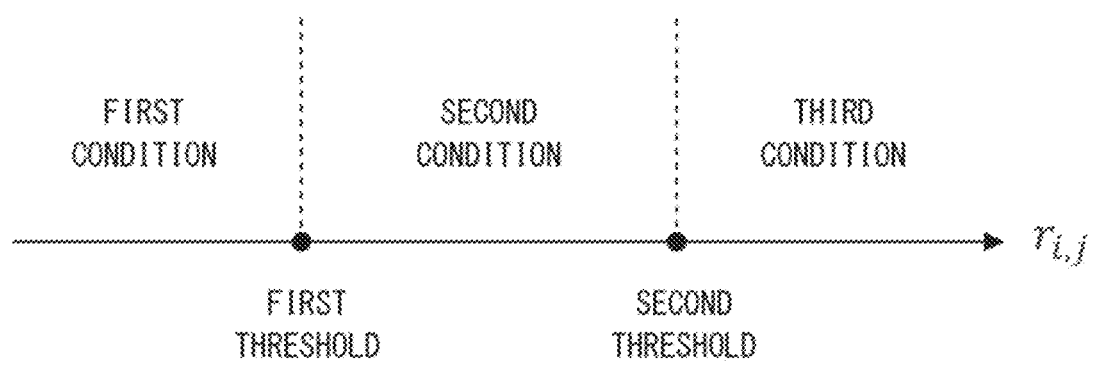
FIG. 10 conceptually illustrates an example of the operation of a condition setting unit related to one or more example embodiments.

An example of the operation of the condition setting unit 333 is described with respect to the case where the interference level index is the first example described above. FIG. 10 is a conceptual diagram showing an example of the operation of the condition setting unit 333. The condition setting unit 333 determines the first, second, and third conditions, as described above. In the example in FIG. 10, the first threshold value for the interference level index $r_{i,j}$ is used to define the boundary between the first and second conditions. Similarly, a second threshold value for the interference level index $r_{i,j}$ is used to define the boundary between the second and third conditions. Depending on the nature or definition of the interference level index $r_{i,j}$, the greater or lesser relationship between the first and second threshold values can be the opposite of that shown in FIG. 10. Specifically, if the interference level index $r_{i,j}$ is defined as an index that increases with increasing interference (e.g., proportional to the interference level), then the relationship between the first and second threshold values is as in the example shown in FIG. 10. On the other hand, if the interference level index $r_{i,j}$ is defined as an index that decreases with increasing interference (e.g., inversely proportional to the interference level), then the relationship between the first and second threshold values is the opposite of that shown in FIG. 10.

If the value of the interference level index $r_{i,j}$ between the radio terminal #i and the radio terminal #j is below the first threshold value, the condition setting unit 333 (or the allocation determination unit 332) determines that the interference level between the radio terminal #i and the radio terminal #j satisfies the first condition. In other words, the condition setting unit 333 (or the allocation determination unit 332) estimates that the interference level between radio terminal #i and radio terminal #j is the first degree.

If the value of the interference level index $r_{i,j}$ between the radio terminal #i and the radio terminal #j is above the first threshold value and below the second threshold value, the condition setting unit 333 (or the allocation determination unit 332) determines that the interference level between the radio terminal #i and the radio terminal #j meets the second condition. In other words, the condition setting unit 333 (or the allocation determination unit 332) estimates that the interference level between radio terminal #i and radio terminal #j is the second degree.

If the value of the interference level index $r_{i,j}$ between the radio terminal #i and the radio terminal #j is above the second threshold value, the condition setting unit 333 (or the allocation determination unit 332) determines that the interference level between the radio terminal #i and the radio terminal #j satisfies the third condition. In other words, the condition setting unit 333 (or the allocation determination unit 332) estimates that the interference level between radio terminal #i and radio terminal #j is the third degree.

The definition of the first, second, and third conditions described with reference to FIG. 10 is by way of example and is not limited thereto. For example, the first, second, and third conditions may be defined using a threshold value (e.g., zero) and a scaling or offset parameter. In this case, the condition setting unit 333 (or the allocation determination unit 332) can determine whether the first condition is satisfied by whether the interference level index $r_{i,j}$ exceeds the threshold value (e.g., zero). The condition setting unit 333 (or the allocation determination unit 332) may adjust the value of the interference level index $r_{i,j}$ with the scaling or offset parameter and determine the fulfillment of the second or third condition by whether the adjusted value exceeds the same threshold value (e.g., zero).

Example Operation of Allocation Determination Unit

Figure 11A:
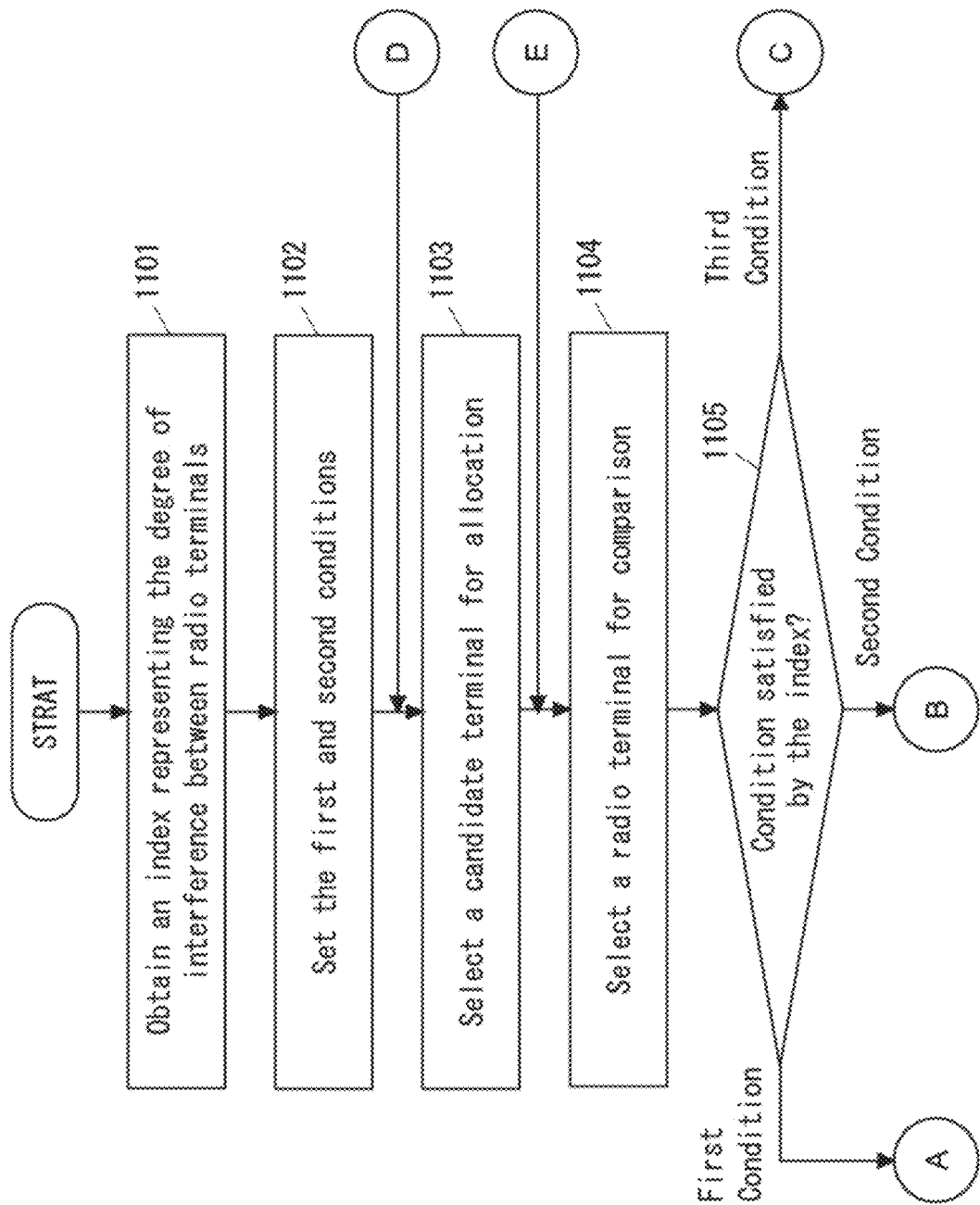
FIG. 11A is a flowchart showing an example of the processing of an allocation determination unit related to one or more example embodiments.
Figure 11B:
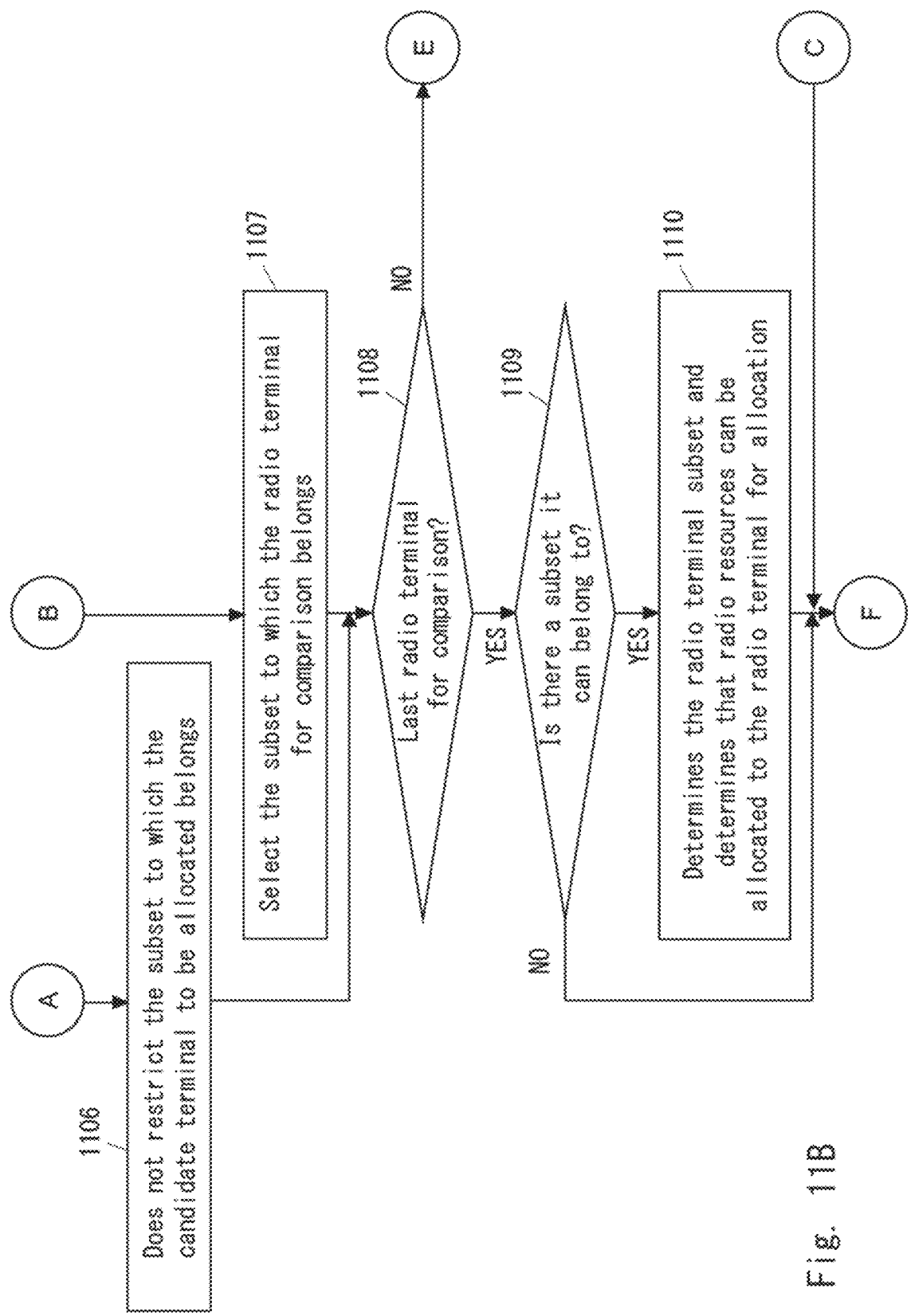
FIG. 11B is a flowchart showing an example of the processing of an allocation determination unit related to one or more example embodiments.
Figure 11C:
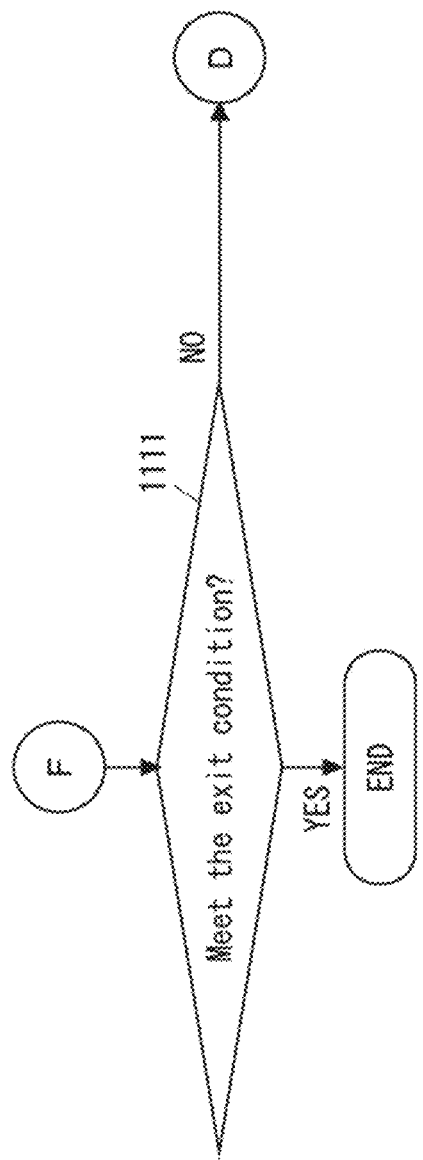
FIG. 11C is a flowchart showing an example of the processing of an allocation determination unit related to one or more example embodiments.

FIGS. 11A, 11B, and 11C show an example of the processing performed by the allocation determination unit 332 to determine multiple radio terminals 10 to be allocated the same radio resources, i.e., time and frequency resources, for spatial multiplexing transmission. In step 1101, the allocation determination unit 332 retrieves one or more interference level indices representing the degree of interference between two or more radio terminals. In step 1102, the allocation determination unit 332 configures the first, second, and third conditions in the condition setting unit 333.

In step 1103, the allocation determination unit 332 selects one radio terminal for allocation (i.e., a second radio terminal) from among the candidate radio terminals for allocation of the radio resources. The allocation determination unit 332 may randomly select one of the plurality of candidate radio terminals for allocation. Alternatively, the allocation determination unit 332 may select a radio terminal for allocation based on a specific metric calculated from the channel information and/or resource allocation status of each candidate radio terminal. The allocation determination unit 332 may select a radio terminal for allocation based on a known scheduling metric.

In step 1104, the allocation determination unit 332 arbitrarily selects a radio terminal as a radio terminal for comparison from among the one or more radio terminals (i.e., one or more first radio terminals) that have already been determined to be allowed to allocate the radio resources in the previous processing (FIGS. 11A-11C).

In step 1105, the allocation determination unit 332 checks whether the interference level index between the radio terminal for allocation and the radio terminal for comparison meets any of the first, second, and third conditions. If the interference level index satisfies the first condition (left branching in step 1105), the allocation determination unit 332 does not restrict the radio terminal for allocation with respect to the radio terminal subsets to which it belongs or is allowed to belong (step 1106). If the interference level index satisfies the second condition (middle branching in step 1105), the allocation determination unit 332 determines that the radio terminal for allocation is allowed to belong only to the same radio terminal subset as the radio terminal for comparison (step 1107). If the interference level index satisfies the third condition (right branching at step 1105), the allocation determination unit 332 determines that the radio terminal for allocation is not allowed to belong to any of the radio terminal subsets and does not allocate the radio resources in question to the radio terminal for allocation.

If the interference level index meets the first or second condition, the allocation determination unit 332 proceeds to step 1108. In step 1108, the allocation determination unit 332 checks whether the radio terminal for comparison selected is the last terminal to be compared. If this is not the last radio terminal to be compared (No in step 1108), the allocation determination unit 332 returns to step 1104 to select the next radio terminal for comparison. On the other hand, if this is the last radio terminal to be compared (Yes in step 1108), in step 1109, the allocation determination unit 332 checks whether there is a radio terminal subset to which the radio terminal for allocation is allowed to belong. The allocation determination unit 332 may perform the check or determination in step 1109 as follows.

In an example, the interference level indices between the radio terminal for allocation and all the radio terminals for comparison satisfy the first condition. In this case, the allocation determination unit 332 determines that the radio terminal for allocation can belong to any radio terminal subset, and thus there is a radio terminal subset to which the radio terminal for allocation is allowed to belong.

In another example, the interference level index between the radio terminal for allocation and one of the radio terminals for comparison satisfies the second condition and the interference level indices between the radio terminal for allocation and the remaining radio terminals for comparison satisfy the first condition. In this case, the allocation determination unit 332 determines that the radio terminal for allocation can belong to the same radio terminal subset as the one radio terminal for comparison that satisfies the second condition, and thus there is a radio terminal subset to which the radio terminal for allocation can belong.

In yet another example, the interference level indices between the radio terminal for allocation and two or more radio terminals for comparison satisfy the second condition, and the interference level indices between the radio terminal for allocation and the remaining radio terminals for comparison satisfy the first condition. In this case, if all of the two or more radio terminals for comparison that meet the second condition can belong to the same radio terminal subset, the allocation determination unit 332 determines that the radio terminal for allocation can belong to the same radio terminal subset as those radio terminals for comparison that satisfy the second condition, and thus there is a radio terminal subset to which the radio terminal for allocation can belong. Otherwise, that is, if the radio terminal for allocation and all the radio terminals that satisfy the second condition cannot belong to the same radio terminal subset, then the allocation determination unit 332 determines that there is no radio terminal subset to which the radio terminal for allocation can belong, and excludes the radio terminal for allocation from the spatial multiplexing transmission on the radio resources in question.

If there is a radio terminal subset to which the radio terminal for allocation can belong (Yes in step 1109), the allocation determination unit 332 proceeds to step 1110. In step 1110, the allocation determination unit 332 determines one or more radio terminal subsets to which the radio terminal for allocation is allowed to belong and determines the allocation of the radio resources in question to the radio terminal for allocation.

In step 1111, the allocation determination unit 332 determines whether the termination condition is satisfied. For example, the termination condition may be that the number of radio terminals for allocation for which the determination has been completed has reached a predetermined number, or that the determination for all candidate radio terminals for allocation has been completed. If the termination condition is satisfied (Yes in step 1111), the allocation determination unit 332 terminates the process. If the termination condition is not satisfied (No in step 1111), the allocation determination unit 332 returns to step 1103 to make a determination for the next radio terminal for allocation.

In the process described with reference to FIGS. 11A, 11B, and 11C, the allocation determination unit 332 identifies one or more radio terminal subsets to which a radio terminal for allocation can belong, but does not yet determine the radio terminal subset to which the radio terminal for allocation actually belongs. After the processes in FIGS. 11A, 11B, and 11C, the allocation determination unit 332 or the scheduling unit 330 may determine the radio terminal subset to which each radio terminal for allocation belongs.

As another example, an implementation is possible in which the subset to which each radio terminal for allocation belongs is already determined prior to the operations in FIGS. 11A, 11B and 11C and cannot be changed. In this case, if the one or more radio terminal subsets to which the radio terminal for allocation is determined to be allowed to belong in step 1110 include the already determined radio terminal subsets, the allocation determination unit 332 or the scheduling unit 330 may determine the allocation of the radio resources in question to the radio terminal for allocation. Otherwise, the allocation determination unit 332 or the scheduling unit 330 may exclude the radio terminal for allocation from the spatial multiplexing transmission on those radio resources.

According to the operation or processing described in this example embodiment, the base station apparatus 20, the control apparatus 21, or the scheduling unit 330 can form a plurality of radio terminal subsets for the partial weight generation method from a plurality of radio terminals that satisfy the first or second condition. Meanwhile, the base station 20, the control apparatus 21, or the scheduling unit 330 can exclude radio terminals that satisfy the third condition, i.e., those for which the elimination of intra-subset interference by the partial weight generation method is presumed to be insufficient, from the spatial multiplexing transmission in the time and frequency resources in question. This helps to reduce both inter-subset interference and intra-subset interference when the partial weight generation method is used.

Further, by appropriately setting the first, second, and third conditions (e.g., first and second threshold values) in the condition setting unit 333, the base station apparatus 20, the control apparatus 21, or the scheduling unit 330 can suppress intra-subset interference and inter-subset interference to different degrees. This helps to achieve an optimal trade-off between interference suppression and spatial multiplexing rate.

Third Example Embodiment

An example configuration of a radio communication system according to this example embodiment is the same as in the examples described with reference to FIGS. 1 to 5 and 7. This example embodiment provides specific examples or variations of the interference level index described in the first and second embodiments.

The interference level index calculated in the index calculation unit 331 may be the second example shown below. The index calculation unit 331 may calculate the interference level index as a ratio (or difference in the case of decibel scale) of the channel power in the main connection link of a radio terminal to the channel power in the interference link of another radio terminal that causes interference to the radio terminal.

The main connection link is the link between the radio terminal and the antenna or beam of the base station apparatus 20 that is primarily used to communicate with the radio terminal. The antenna or beam that is primarily used may be some or all of the antennas or beams that are actually used to communicate with the radio terminal. For example, the primary connection link may be the link between the radio terminal and one or more antennas or one or more beams of one radio apparatus 22 that provides the greatest channel power among the plurality of radio apparatus 22 with respect to the radio terminal. In another example, the main connection link may be the link between the radio terminal and one or more antennas or one or more beams of the plurality of radio apparatuses 22 selected by any criteria.

The interference link is the link of another radio terminal that interferes with the communications of the radio terminal of interest. For example, in the case of the uplink, the channel power of the interference link may be the channel power of the uplink signal of another radio terminal that is received by the antenna or beam of the main connection link of the radio terminal of interest. In the case of the downlink, the channel power of the interference link may be the channel power of the downlink signal of another radio terminal that is transmitted by the main connection antenna or beam for the other radio terminal and received by the radio terminal of interest.

The channel power may be the square value of a channel coefficient estimated from an SRS or DMRS, etc. Alternatively, the channel power may be calculated using the received power (e.g., RSRP) of a downlink reference signal as reported by the radio terminal.

Figure 12:
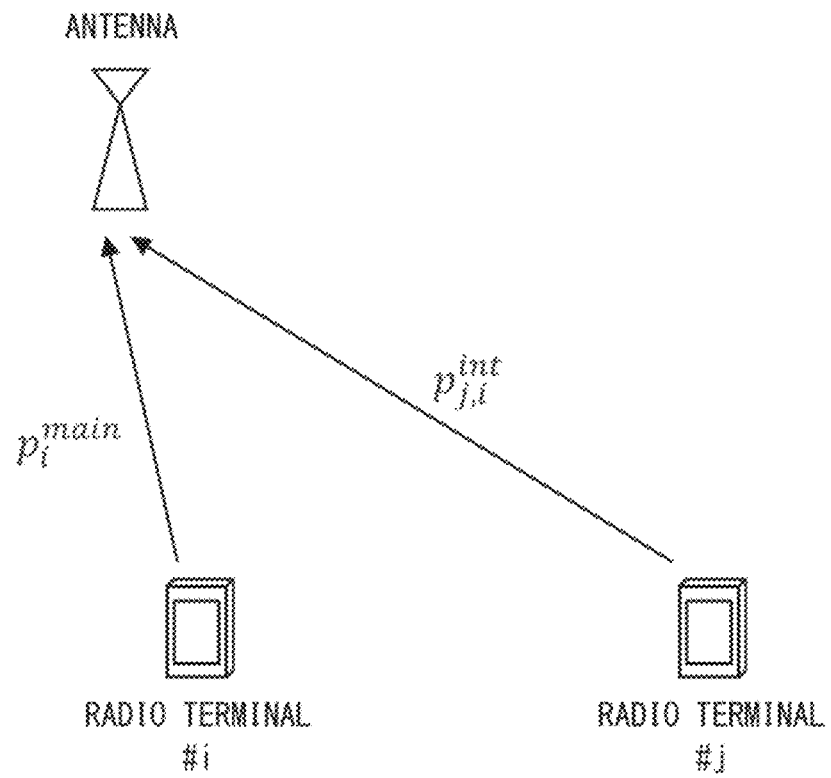
FIG. 12 conceptually illustrates an example of an index representing the level of interference related to one or more example embodiments.

The index calculation unit 331 calculates the interference level index $r_{i,j}$ between the radio terminal #i and the radio terminal #j according to the following formula:

$$r_{i,j} = p_i^{main} - p_{j,i}^{int}$$

where $p_i^{main}$ is the channel power of the main connection link of the radio terminal #i and $p_{j,i}^{int}$ is the channel power of the interference link of the radio terminal #j to the radio terminal #i, both expressed on a decibel scale. FIG. 12 shows a conceptual diagram of this variant using the channel power in the uplink.

Compared to the case where the interference level index is calculated based on the inner product of the channel vectors or channel power vectors between the radio terminal and the radio apparatus, this variant reduces the amount of calculation required to calculate the interference level index. In addition, this variant requires only the channel power of the main connection link of the radio terminal of interest and the channel power of the interference link from another radio terminal to the radio terminal of interest to calculate the interference level index. This makes it easier to obtain channel information compared to the case where the interference level index is calculated based on the inner product of the channel vectors or channel power vectors between the radio terminal and the radio apparatus.

Fourth Example Embodiment

An example configuration of a radio communication system according to this example embodiment is the same as in the examples described with reference to FIGS. 1 to 5 and 7. This example embodiment provides specific examples or variations of the interference level index described in the first and second embodiments.

The interference level index calculated in the index calculation unit 331 may be the third example shown below. The index calculation unit 331 calculates the product (or sum in the case of decibel scale) of the maximum interference to noise power ratio (INR) caused by the radio terminal for allocation to the one or more radio terminals that have already been determined to be allocated the radio resources and the maximum INR suffered by the radio terminal for allocation from the one or more radio terminals that have already been determined to be allocated the radio resources. The index calculation unit 331 then calculates the interference level index by subtracting the calculated product (sum in the case of decibel scale) of the largest generating INR and the largest received INR from the signal-to-noise power ratio (SNR) of the channel in the main connection link of the radio terminal for allocation.

Figure 13:
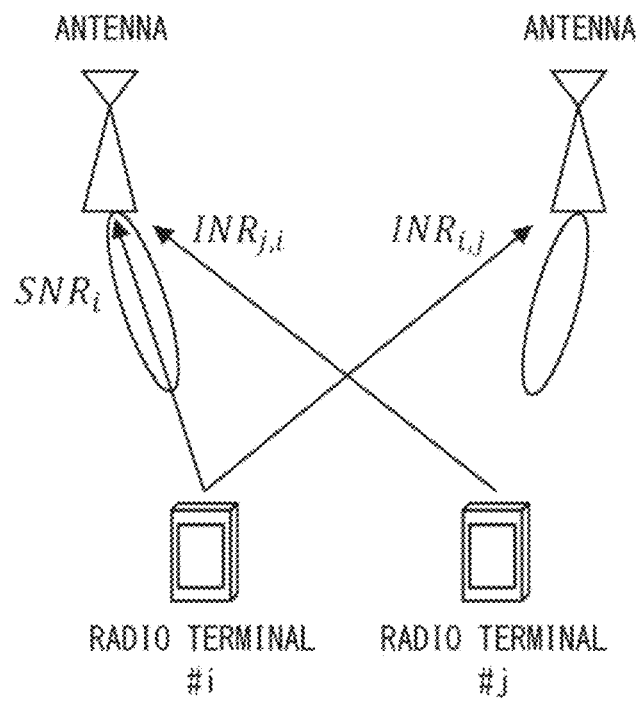
FIG. 13 conceptually illustrates an example of an index representing the level of interference related to one or more example embodiments.

The index calculation unit 331 calculates the interference level index $r_{i,j}$ between the radio terminal #i for allocation and the radio terminal #j for comparison according to the following formula:

$$r_{i,j} = SNR_i - INR_{i,j} \cdot INR_{j,i}$$

where $SNR_i$ is the SNR on the primary connection link of the radio terminal #i for allocation, $INR_{i,j}$ is the generating INR that radio terminal #i for allocation causes on the primary connection link of radio terminal #j for comparison, and $INR_{j,i}$ is the received INR that the radio terminal #j for comparison causes on the primary connection link of the radio terminal #i for allocation. These are all denoted by true values. FIG. 13 shows a conceptual diagram of this variant using the channel power in the uplink.

Compared to the case where the interference level index is calculated based on the inner product of the channel vectors or channel power vectors between the radio terminal and the radio apparatus, this variant reduces the amount of calculation required to calculate the interference level index. In addition, this variant can simultaneously consider the generating INR given by the radio terminal for allocation to the radio terminal for comparison and the received INR caused by the radio terminal for comparison to the radio terminal for allocation.

Fifth Example Embodiment

An example configuration of a radio communication system according to this example embodiment is the same as in the examples described with reference to FIGS. 1 to 5 and 7. This example embodiment provides specific examples or variations of the interference level index described in the first and second embodiments.

Figure 14:
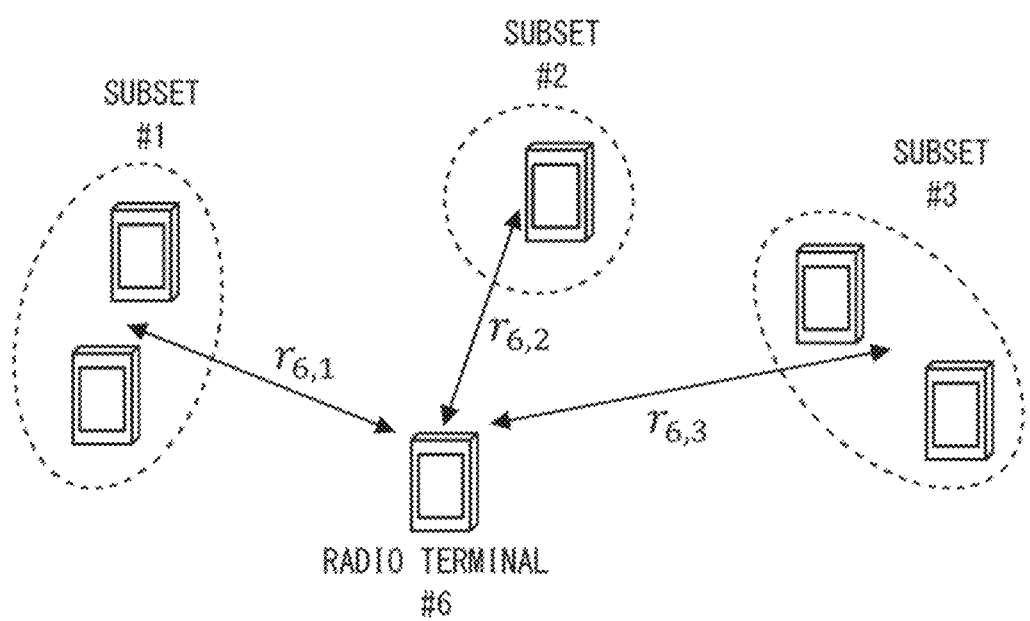
FIG. 14 conceptually illustrates an example of an index representing the level of interference related to one or more example embodiments.

As already described, the index calculation unit 331 may calculate an interference level index that represents the degree of interference between a radio terminal and a group of radio terminals. FIG. 14 is a conceptual diagram of the calculation of the interference level index in this variant. In the example in FIG. 14, the index calculation unit 331 calculates the interference level indexes $r_{6,1}$, $r_{6,2}$, and $r_{6,3}$ between the radio terminal #6 and each of the radio terminal subsets #1, #2, and #3. For example, the index calculation unit 331 calculates the interference level index $r_{6,1}$ between the radio terminal #6 and the radio terminal subset #1 according to the following formula:

$$r_{6,1} = \frac{p_6 \cdot p_{subset1}}{\|p_6\| \|p_{subset1}\|}$$

where $P_6$ is the channel power vector of the radio terminal #6 and $P_{subset1}$ is the average channel power vector of the two radio terminals belonging to the radio terminal subset #1. The numerator is the inner product of the channel power vector $P_6$ and the channel power vector $P_{subset1}$. $P_{subset1}$ may be the channel power vector of one of the two radio terminals belonging to radio terminal subset #1 that has the largest similarity r (or smallest difference) with the radio terminal #6.

The index calculation unit 331 may calculate the interference level index between a radio terminal and a radio terminal subset as an interference level index based on the Treating Interference as Noise (TIN) condition. The index calculation unit 331 may calculate the interference level index $r_{6,1}$ between the radio terminal #6 and the radio terminal subset #1 according to the following formula:

$$r_{6,1} = SNR_6 - \max_{j \in C_1} INR_{6,j} \cdot \max_{j' \in C_1} INR_{6,j'}$$

Sixth Example Embodiment

An example configuration of a radio communication system according to this example embodiment is the same as in the examples described with reference to FIGS. 1 to 5 and 7. This embodiment provides specific examples of the method of determining or adjusting the boundary between the first and second degree of the interference level and the boundary between the second and third degree of the interference level, as described in the first embodiment. Alternatively, this embodiment provides specific examples of the method of setting or adjusting the first, second, and third conditions for the interference level index, as described in the second embodiment.

The scheduling unit 330 may set the first boundary between the first degree of interference level and the second degree of interference level, and the second boundary between the second degree of interference level and the third degree of interference level, based on the interference level index representing the degree of interference between radio terminals. Similarly, the condition setting unit 333 may dynamically set the first, second, and third conditions based on the interference level index. In this case, the condition setting unit 333 may determine the first and second threshold values using the average of the interference level indices among a plurality of radio terminals and based on first and second scaling parameters. In this variant, the condition setting unit 333 may calculate the first threshold value $Th_1$ and the second threshold value $Th_2$ using the following formula:

$$Th_1 = a_1 r^{avg}$$

$$Th_2 = a_2 r^{avg}$$

where $a_1$ and $a_2$ are the first and second scaling parameters, respectively, and $r^{avg}$ is the average interference level indices among the plurality of radio terminals.

The average value of the interference level indices among the plurality of radio terminals may be, for example, the average value of the interference level indices of all possible radio terminal pairs of all radio terminals located within the service area of the base station apparatus 20. As another example, the average value of the interference level indices among the plurality of radio terminals may be the average value of the interference level indices between one or more radio terminals awaiting allocation of the radio resources and each of the other radio terminals within the service area of the base station apparatus 20.

This variant allows the first, second, and third degrees of interference levels or the first, second, and third conditions for interference level indices to be determined or adjusted in accordance with the state of the communication channel between the radio apparatus 22 and the radio terminal 10. This enables appropriate settings of the conditions for determining a plurality of radio terminals 10 to be allocated the same time and frequency resources and for determining radio terminal subsets, following communication path fluctuations due to changes in the location and number of radio terminals communicating with the base station apparatus 20.

Seventh Example Embodiment

An example configuration of a radio communication system according to this example embodiment is the same as in the examples described with reference to FIGS. 1 to 5 and 7. This embodiment provides specific examples of the method of determining or adjusting the boundary between the first and second degree of the interference level and the boundary between the second and third degree of the interference level, as described in the first embodiment. Alternatively, this embodiment provides specific examples of the method of setting or adjusting the first, second, and third conditions for the interference level index, as described in the second embodiment.

The scheduling unit 330 may change or adjust one or both of the first boundary between the first degree of interference level and the second degree of interference level and the second boundary between the second degree of interference level and the third degree of interference level, depending on the total number of radio terminals determined to be able to belong to any radio terminal subset for the spatial multiplexing transmission. For example, if the total number of radio terminals determined to be eligible to belong to any radio terminal subset for the spatial multiplexing transmission is less than a reference value, then the scheduling unit 330 may update one or both of the first and second boundary values to be larger than their current values. In other words, the scheduling unit 330 may adjust one or both of the first and second boundary values to allow more radio terminals to share the same time and frequency resources.

After this update, the scheduling unit 330 may redo the process (e.g., the process in FIG. 6) of determining whether or not the radio resources can be allocated to each radio terminal 10 and determining one or more radio terminal subsets to which each radio terminal 10 can belong. The scheduling unit 330 may gradually change or adjust one or both of the first and second boundaries until the total number of radio terminals determined to be eligible to belong to any of the radio terminal subsets for the spatial multiplexing transmission exceeds the reference value.

Similarly, the condition setting unit 333 may change or adjust at least one of the first, second, and third conditions depending on the number of radio terminals that are determined to be able to belong to a plurality of radio terminal subsets for the spatial multiplexing transmission. For example, consider the case where the first, second, and third conditions are determined or defined by the first and second threshold values for the interference level index as shown in FIG. 10. In this case, if the total number of radio terminals determined to be able to belong to any of the radio terminal subsets for the spatial multiplexing transmission is less than a reference value, the condition setting unit 333 may update one or both of the first and second threshold values to be larger than their current values. If the interference level index is defined as an index that decreases with increasing interference (e.g., inversely proportional to the interference level), the condition setting unit 333 may update one or both of the first and second threshold values to be smaller than their current values. The condition setting unit 333 may gradually change or adjust one or both of the first and second threshold values until the total number of radio terminals determined to be able to belong to any radio terminal subset for the spatial multiplexing transmission exceeds the reference value.

Figure 15:
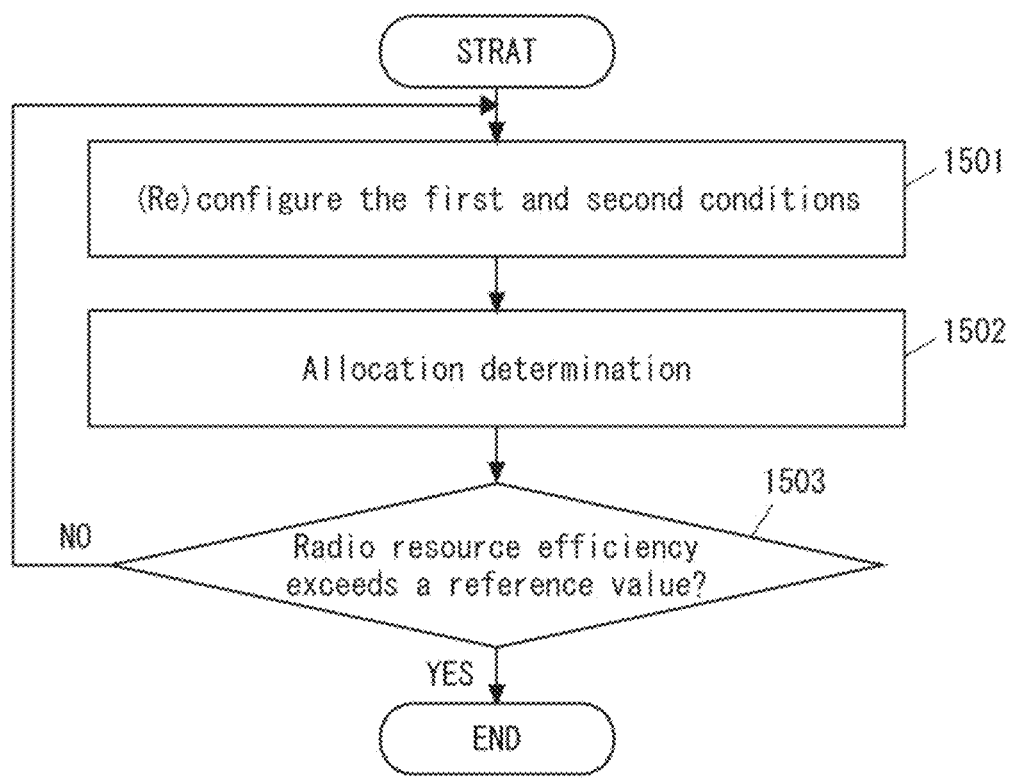
FIG. 15 is a flowchart showing an example of the processing of a condition setting unit related to one or more example embodiments.

FIG. 15 shows an example of the processing in the scheduling unit 330. In step 1501, the condition setting unit 333 sets or re-sets at least one of the first, second, and third conditions. In step 1502, the allocation determination unit 332 performs processing to determine whether or not the radio resources can be allocated to each radio terminal 10 and to determine one or more radio terminal subsets to which each radio terminal 10 can belong. This process may be similar to, for example, the example described with reference to FIG. 6 or FIGS. 11A to 11C.

In step 1503, the allocation determination unit 332 determines whether or not the radio resource efficiency is greater than a reference value. In other words, the allocation determination unit 332 determines whether the total number of radio terminals determined to be able to belong to any radio terminal subset for the spatial multiplexing transmission exceeds a reference value. If the radio resource efficiency exceeds the reference value (Yes in step 1503), the allocation determination unit 332 terminates the process. If the radio resource efficiency is less than the reference value (No in step 1503), the allocation determination unit 332 returns to step 1401. To allow more radio terminals to share the same time and frequency resources for the spatial multiplexing transmission, the condition setting unit 333 reconfigures at least one of the first, second, and third conditions to be relaxed.

In the specific example described in this example embodiment, the scheduling unit 330 can adjust the first, second, and third degrees of interference level, or the first, second, and third conditions on the interference level index so that the radio resource efficiency exceeds a reference value. This helps to prevent excessive degradation of radio resource efficiency. In other words, this can help achieve radio resource allocation that exceeds the target radio resource efficiency while reducing intra-subset and inter-subset interference.

Eighth Example Embodiment

An example configuration of a radio communication system according to this example embodiment is the same as in the examples described with reference to FIGS. 1 to 5 and 7.

Some or all of the processing performed by the scheduling unit 330 or the allocation determination unit 332 in the example embodiments described above, particularly the process of determining whether or not the radio resources can be allocated to each radio terminal 10 and determining one or more radio terminal subsets to which each radio terminal 10 can belong, may be performed by inference using a trained machine learning (ML) model. The ML model training may be performed by the control apparatus 21 or by another network element, such as a Near-RT RIC or a Non-RT RIC. The control apparatus 21, the scheduling unit 330, or the allocation determination unit 332 may act as the ML model inference host, and another network element, such as a Near-RT RIC or a Non-RT RIC, may act as the ML model training host.

In one implementation, the control apparatus 21, the scheduling unit 330, or the allocation determination unit 332 may use identifiers of a plurality of radio terminals 10 and the interference level indices among the plurality of radio terminals 10 as input data to the trained ML model. The trained ML model may output, as an inference result, identifiers of radio terminals 10 assigned to the same time and frequency resources and groupings of these identifiers into one or more radio terminal subsets. The inference result by the trained ML model may be similar to the results of steps 602, 603, and 604 in FIG. 6. In other words, the ML model may be trained to output an inference result similar to the results of steps 602, 603, and 604 in FIG. 6.

Ninth Example Embodiment

A configuration example of a radio communication system according to this example embodiment may be the same as in the examples described with reference to FIGS. 1 through 5 and FIG. 7. The processing of the scheduling unit 330 described in the example embodiment above may be implemented by the processing unit 213 of the control apparatus 21 executing one or more programs. The one or more programs contain a set of instructions (or software code) that, when loaded into a computer, cause the computer to perform one or more functions of the radio terminal 10. Each of these programs may be stored in a non-transitory computer readable medium or a tangible storage medium. By way of example, and not limitation, non-transitory computer readable media or tangible storage media can include a random-access memory (RAM), a read-only memory (ROM), a flash memory, a solid-state drive (SSD) or other memory technologies, CD-ROM, digital versatile disk (DVD), Blu-ray (registered mark) disc or other optical disk storage, magnetic cassettes, magnetic tape, magnetic disk storage or other magnetic storage devices. Each program may be transmitted on a transitory computer readable medium or a communication medium. By way of example, and not limitation, transitory computer readable media or communication media can include electrical, optical, acoustical, or other form of propagated signals.

An example advantage according to the above-described example embodiments is to help reduce both inter-subset interference and intra-subset interference when using a partial weighting method.

The above-described example embodiments are merely examples of applications of the technical ideas obtained by the inventor. These technical ideas are not limited to the above-described example embodiments and various modifications can be made thereto.

For example, the whole or part of the example embodiments disclosed above can be described as, but not limited to, the following supplementary notes. Of course, some or all of the elements (e.g., configurations and functionality) described in the Supplementary Notes directed to a device (e.g., control apparatus) may also be described as or in Supplementary Notes directed to methods and programs. For example, some or all of the elements listed in Supplementary Notes 2 through 13 that depend on Supplementary Note 1 may also be listed as Supplementary Notes that depend on Supplementary Note 14 or 15 with the same dependency as Supplementary Notes 2 through 13. Some or all of the elements described in a Supplementary Note may be applicable to various hardware, software, storage for storing software, systems, and methods.

Supplementary Note 1

A control apparatus comprising:
at least one memory; and
at least one processor coupled to the at least one memory and configured to determine a plurality of radio terminal subsets to perform spatial multiplexing transmission on the same time and frequency resources to or from a base station apparatus equipped with a plurality of antennas, wherein
each radio terminal subset comprises one or more radio terminals performing subset-wise multiple-input multiple-output (MIMO) transmission on the time and frequency resources to or from a corresponding base station antenna subset selected from the plurality of antennas, and
the least one processor configured to:
  if an interference level between a second radio terminal and each of one or more first radio terminals that have already been determined to share the time and frequency resources for the spatial multiplexing transmission is estimated to be a first degree, determine that the time and frequency resources can be allocated to the second radio terminal and that the second radio terminal is allowed to any radio terminal subset;
  if an interference level between the second radio terminal and at least one of the one or more first radio terminals is estimated to be a second degree greater than the first degree and less than a third degree, determine that the second radio terminal is required to belong to the same radio terminal subset as the at least one first radio terminal in order to allocate the time and frequency resources to the second radio terminal for the spatial multiplexing transmission; and
  if an interference level between the second radio terminal and at least one of the one or more first radio terminals is estimated to be the third degree greater than the first degree and the second degree, determine that the second radio terminal is not allowed to belong to any radio terminal subset and that the second radio terminal is excluded from the spatial multiplexing transmission on the time and frequency resources.

Supplementary Note 2

The control apparatus according to Supplementary Note 1, wherein the at least one processor is configured to adjust one or both of a first boundary between the first degree and the second degree and a second boundary between the second degree and the third degree, depending on a number of radio terminals that have been determined to be allowed to belong to the plurality of radio terminal subsets for the spatial multiplexing transmission.

Supplementary Note 3

The control apparatus according to Supplementary Note 2, wherein the at least one processor is configured to increase one or both of a value of the first boundary and a value of the second boundary compared to their current values.

Supplementary Note 4

The control apparatus according to any one of Supplementary Notes 1 to 3, wherein the at least one processor is configured to determine whether the interference level is estimated to be in the first degree, the second degree, or the third degree, based on an index representing a degree of interference between the second radio terminal and each of the one or more first radio terminals.

Supplementary Note 5

The control apparatus according to Supplementary Note 4, wherein the at least one processor is configured to set, based on the index, a first boundary between the first degree and the second degree and a second boundary between the second degree and the third degree.

Supplementary Note 6

The control apparatus according to any one of Supplementary Notes 1 to 3, wherein the at least one processor is configured to:
  calculate an index representing a degree of interference between the second radio terminal and each of one or more radio terminal subsets to which the one or more first radio terminals belong or are allowed to belong; and
  determine, based on the calculated index, whether the interference level is estimated to be in the first degree, the second degree, or the third degree.

Supplementary Note 7

The control apparatus according to Supplementary Note 6, wherein the at least one processor is configured to set, based on the index, a first boundary between the first degree and the second degree and a second boundary between the second degree and the third degree.

Supplementary Note 8

The control apparatus according to Supplementary Note 4 or 5, wherein the at least one processor is configured to calculate the index based on channel information between each first radio terminal and a part or all of the plurality of antennas and based on channel information between the second radio terminal and a part or all of the plurality of antennas.

Supplementary Note 9

The control apparatus according to Supplementary Note 4 or 5, wherein the at least one processor is configured to calculate the index based on an inner product of a channel vector or channel power vector between each first radio terminal and a part or all of the plurality of antennas and a channel vector or channel power vector between the second radio terminal and a part or all of the plurality of antennas.

Supplementary Note 10

The control apparatus according to Supplementary Note 4 or 5, wherein the at least one processor is configured to calculate the index based on a ratio or difference between a received power of the second radio terminal and a received power of each first radio terminal.

Supplementary Note 11

The control apparatus according to Supplementary Note 4 or 5, wherein the at least one processor is configured to calculate the index based on a value obtained by subtracting, from a signal-to-noise power ratio of the second radio terminal, a product of a maximum interference-to-noise power ratio caused by the second radio terminal to each first radio terminal and an interference-to-noise power ratio suffered by the second radio terminal from each first radio terminal.

Supplementary Note 12

The control apparatus according to any one of Supplementary Notes 1 to 11, wherein the at least one processor is configured to calculate precoding or post-coding weights for each of the plurality of radio terminal subsets using a partial weight generation method.

Supplementary Note 13

The control apparatus according to any one of Supplementary Notes 1 to 11, wherein the at least one processor is configured to calculate precoding or post-coding weights for each of the plurality of radio terminal subsets using an interference cancellation matrix for each radio terminal subset.

Supplementary Note 14

The control apparatus according to Supplementary Note 3, wherein the at least one processor is configured to increase the value of the first boundary by increasing a threshold value for an index defined to increase with increasing interference between the second radio terminal and each of the one or more first radio terminals.

Supplementary Note 15

The control apparatus according to Supplementary Note 3, wherein the at least one processor is configured to increase the value of the first boundary by decreasing a threshold value for an index defined to decrease with increasing interference between the second radio terminal and each of the one or more first radio terminals.

Supplementary Note 16

A method performed by a control apparatus, the method comprising:
   determining a plurality of radio terminal subsets to perform spatial multiplexing transmission on the same time and frequency resources to or from a base station apparatus equipped with a plurality of antennas, wherein
   each radio terminal subset comprises one or more radio terminals performing subset-wise multiple-input multiple-output (MIMO) transmission on the time and frequency resources to or from a corresponding base station antenna subset selected from the plurality of antennas, and
   the determining comprising:
      if an interference level between a second radio terminal and each of one or more first radio terminals that have already been determined to share the time and frequency resources for the spatial multiplexing transmission is estimated to be a first degree, determining that the time and frequency resources can be allocated to the second radio terminal and that the second radio terminal is allowed to any radio terminal subset;
      if an interference level between the second radio terminal and at least one of the one or more first radio terminals is estimated to be a second degree greater than the first degree and less than a third degree, determining that the second radio terminal is required to belong to the same radio terminal subset as the at least one first radio terminal in order to allocate the time and frequency resources to the second radio terminal for the spatial multiplexing transmission; and
      if an interference level between the second radio terminal and at least one of the one or more first radio terminals is estimated to be the third degree greater than the first degree and the second degree, determining that the second radio terminal is not allowed to belong to any radio terminal subset and that the second radio terminal is excluded from the spatial multiplexing transmission on the time and frequency resources.

Supplementary Note 17

A program for causing a computer to perform a method for a control apparatus, the method comprising:
   determining a plurality of radio terminal subsets to perform spatial multiplexing transmission on the same time and frequency resources to or from a base station apparatus equipped with a plurality of antennas, wherein
   each radio terminal subset comprises one or more radio terminals performing subset-wise multiple-input multiple-output (MIMO) transmission on the time and frequency resources to or from a corresponding base station antenna subset selected from the plurality of antennas, and
   the determining comprising:
      if an interference level between a second radio terminal and each of one or more first radio terminals that have already been determined to share the time and frequency resources for the spatial multiplexing transmission is estimated to be a first degree, determining that the time and frequency resources can be allocated to the second radio terminal and that the second radio terminal is allowed to any radio terminal subset;

if an interference level between the second radio terminal and at least one of the one or more first radio terminals is estimated to be a second degree greater than the first degree and less than a third degree, determining that the second radio terminal is required to belong to the same radio terminal subset as the at least one first radio terminal in order to allocate the time and frequency resources to the second radio terminal for the spatial multiplexing transmission; and if an interference level between the second radio terminal and at least one of the one or more first radio terminals is estimated to be the third degree greater than the first degree and the second degree, determining that the second radio terminal is not allowed to belong to any radio terminal subset and that the second radio terminal is excluded from the spatial multiplexing transmission on the time and frequency resources.

The invention claimed is:

1. A method performed by a control apparatus, the method comprising:

determining a plurality of radio terminal subsets to perform spatial multiplexing transmission on the same time and frequency resources to or from a base station apparatus equipped with a plurality of antennas, wherein each radio terminal subset comprises one or more radio terminals performing subset-wise multiple-input multiple-output (MIMO) transmission on the time and frequency resources to or from a corresponding base station antenna subset selected from the plurality of antennas, and the determining comprising:

if an interference level between a second radio terminal and each of one or more first radio terminals that have already been determined to share the time and frequency resources for the spatial multiplexing transmission is estimated to be a first degree, determining that the time and frequency resources can be allocated to the second radio terminal and that the second radio terminal is allowed to any radio terminal subset;

if an interference level between the second radio terminal and at least one of the one or more first radio terminals is estimated to be a second degree greater than the first degree and less than a third degree, determining that the second radio terminal is required to belong to the same radio terminal subset as the at least one first radio terminal in order to allocate the time and frequency resources to the second radio terminal for the spatial multiplexing transmission; and if an interference level between the second radio terminal and at least one of the one or more first radio terminals is estimated to be the third degree greater than the first degree and the second degree, determining that the second radio terminal is not allowed to belong to any radio terminal subset and that the second radio terminal is excluded from the spatial multiplexing transmission on the time and frequency resources.

2. The method according to claim 1, further comprising adjusting one or both of a first boundary between the first degree and the second degree and a second boundary between the second degree and the third degree, depending on a number of radio terminals that have been determined to be allowed to belong to the plurality of radio terminal subsets for the spatial multiplexing transmission.

3. The method according to claim 2, wherein the adjusting comprises, in response to the number of radio terminals being below a reference value, increasing one or both of a value of the first boundary and a value of the second boundary compared to their current values.

4. The method according to claim 1, further comprising determining whether the interference level is estimated to be in the first degree, the second degree, or the third degree, based on an index representing a degree of interference between the second radio terminal and each of the one or more first radio terminals.

5. The method according to claim 4, further comprising setting, based on the index, a first boundary between the first degree and the second degree and a second boundary between the second degree and the third degree.

6. The method according to claim 1, wherein the determining comprises:

calculating an index representing a degree of interference between the second radio terminal and each of one or more radio terminal subsets to which the one or more first radio terminals belong or are allowed to belong; and determining, based on the calculated index, whether the interference level is estimated to be in the first degree, the second degree, or the third degree.

7. The method according to claim 6, further comprising setting, based on the index, a first boundary between the first degree and the second degree and a second boundary between the second degree and the third degree.

8. The method according to claim 4, further comprising calculating the index based on channel information between each first radio terminal and a part or all of the plurality of antennas and based on channel information between the second radio terminal and a part or all of the plurality of antennas.

9. The method according to claim 4, further comprising calculating the index based on an inner product of a channel vector or channel power vector between each first radio terminal and a part or all of the plurality of antennas and a channel vector or channel power vector between the second radio terminal and a part or all of the plurality of antennas.

10. The method according to claim 4, further comprising calculating the index based on a ratio or difference between a received power of the second radio terminal and a received power of each first radio terminal.

11. The method according to claim 4, further comprising calculating the index based on a value obtained by subtracting, from a signal-to-noise power ratio of the second radio terminal, a product of a maximum interference-to-noise power ratio caused by the second radio terminal to each first radio terminal and an interference-to-noise power ratio suffered by the second radio terminal from each first radio terminal.

12. The method according to claim 1, further comprising calculating precoding or post-coding weights for each of the plurality of radio terminal subsets using a partial weight generation method.

13. The method according to claim 1, further comprising calculating precoding or post-coding weights for each of the plurality of radio terminal subsets using an interference cancellation matrix for each radio terminal subset.

14. The method according to claim 3, wherein the adjusting comprises increasing the value of the first boundary by increasing a threshold value for an index defined to increase with increasing interference between the second radio terminal and each of the one or more first radio terminals.

15. The method according to claim 3, wherein the adjusting comprises increasing the value of the first boundary by decreasing a threshold value for an index defined to decrease with increasing interference between the second radio terminal and each of the one or more first radio terminals.

16. A control apparatus comprising:
at least one memory; and
at least one processor coupled to the at least one memory and configured to determine a plurality of radio terminal subsets to perform spatial multiplexing transmission on the same time and frequency resources to or from a base station apparatus equipped with a plurality of antennas, wherein
each radio terminal subset comprises one or more radio terminals performing subset-wise multiple-input multiple-output (MIMO) transmission on the time and frequency resources to or from a corresponding base station antenna subset selected from the plurality of antennas, and
the least one processor configured to:
  if an interference level between a second radio terminal and each of one or more first radio terminals that have already been determined to share the time and frequency resources for the spatial multiplexing transmission is estimated to be a first degree, determine that the time and frequency resources can be allocated to the second radio terminal and that the second radio terminal is allowed to any radio terminal subset;
  if an interference level between the second radio terminal and at least one of the one or more first radio terminals is estimated to be a second degree greater than the first degree and less than a third degree, determine that the second radio terminal is required to belong to the same radio terminal subset as the at least one first radio terminal in order to allocate the time and frequency resources to the second radio terminal for the spatial multiplexing transmission; and
  if an interference level between the second radio terminal and at least one of the one or more first radio terminals is estimated to be the third degree greater than the first degree and the second degree, determine that the second radio terminal is not allowed to belong to any radio terminal subset and that the second radio terminal is excluded from the spatial multiplexing transmission on the time and frequency resources.

17. A non-transitory computer readable medium storing a program for causing a computer to perform a method for a control apparatus, the method comprising:
determining a plurality of radio terminal subsets to perform spatial multiplexing transmission on the same time and frequency resources to or from a base station apparatus equipped with a plurality of antennas, wherein
each radio terminal subset comprises one or more radio terminals performing subset-wise multiple-input multiple-output (MIMO) transmission on the time and frequency resources to or from a corresponding base station antenna subset selected from the plurality of antennas, and
the determining comprising:
  if an interference level between a second radio terminal and each of one or more first radio terminals that have already been determined to share the time and frequency resources for the spatial multiplexing transmission is estimated to be a first degree, determining that the time and frequency resources can be allocated to the second radio terminal and that the second radio terminal is allowed to any radio terminal subset;
  if an interference level between the second radio terminal and at least one of the one or more first radio terminals is estimated to be a second degree greater than the first degree and less than a third degree, determining that the second radio terminal is required to belong to the same radio terminal subset as the at least one first radio terminal in order to allocate the time and frequency resources to the second radio terminal for the spatial multiplexing transmission; and
  if an interference level between the second radio terminal and at least one of the one or more first radio terminals is estimated to be the third degree greater than the first degree and the second degree, determining that the second radio terminal is not allowed to belong to any radio terminal subset and that the second radio terminal is excluded from the spatial multiplexing transmission on the time and frequency resources.

* * * * *